United States Patent
Feng et al.

(10) Patent No.: US 8,934,868 B2
(45) Date of Patent: Jan. 13, 2015

(54) METHOD FOR UPDATING AND GENERATING AIR INTERFACE KEY AND RADIO ACCESS SYSTEM

(75) Inventors: Chengyan Feng, Shenzhen (CN); Feng He, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 24 days.

(21) Appl. No.: 13/702,190

(22) PCT Filed: Mar. 11, 2011

(86) PCT No.: PCT/CN2011/071719
§ 371 (c)(1),
(2), (4) Date: Dec. 5, 2012

(87) PCT Pub. No.: WO2011/153855
PCT Pub. Date: Dec. 15, 2011

(65) Prior Publication Data
US 2013/0078956 A1 Mar. 28, 2013

(30) Foreign Application Priority Data

Jun. 7, 2010 (CN) .......................... 2010 1 0202417

(51) Int. Cl.
| | |
|---|---|
| *H04W 12/04* | (2009.01) |
| *H04W 36/08* | (2009.01) |
| *H04W 36/00* | (2009.01) |
| H04W 88/12 | (2009.01) |
| H04W 36/10 | (2009.01) |

(52) U.S. Cl.
CPC .............. *H04W 36/08* (2013.01); *H04W 12/04* (2013.01); *H04W 36/0038* (2013.01); *H04W 88/12* (2013.01); *H04W 36/10* (2013.01)
USPC ............................. 455/411; 455/436; 455/438

(58) Field of Classification Search
CPC ...... H04W 36/08; H04W 36/10; H04W 12/04
USPC .......................................... 455/411, 436, 438
See application file for complete search history.

(56) References Cited

U.S. PATENT DOCUMENTS

| | | | |
|---|---|---|---|
| 2002/0018571 A1 | 2/2002 | Anderson et al. | |
| 2004/0039910 A1* | 2/2004 | Isokangas et al. | ............ 713/171 |

(Continued)

FOREIGN PATENT DOCUMENTS

| | | |
|---|---|---|
| CN | 101094439 A | 12/2007 |
| CN | 101232731 A | 7/2008 |

(Continued)

OTHER PUBLICATIONS

Universal Mobile Telecommunications System (UMTS); 3G security; Security architecture (3GPP TS 33.102 version 7.1.0 Release 7.*

(Continued)

*Primary Examiner* — Qun Shen
(74) *Attorney, Agent, or Firm* — Knobbe, Martens, Olson & Bear, LLP

(57) ABSTRACT

The disclosure discloses a method for updating and generating an air interface key and a radio access system. The updating method comprises: a source Radio Network Controller (RNC) completes the static relocation towards a target RNC; the target RNC performs intra-Serving-RNC (SRNC) relocation; during the intra-SRNC relocation, the target RNC updates enhanced key of itself according to a key received from the source RNC or a core network node. With the disclosure, the enhanced air interface key can be updated during the SRNC static relocation process without increasing the time delay of the SRNC relocation, and security and efficiency of the system are improved.

16 Claims, 11 Drawing Sheets

(56) References Cited

U.S. PATENT DOCUMENTS

2011/0201337 A1* 8/2011 Forsberg et al. ............. 455/436
2013/0003967 A1* 1/2013 Norrman et al. ................ 380/44

FOREIGN PATENT DOCUMENTS

| CN | 101715188 A | 5/2010 |
| CN | 101867924 A | 10/2010 |
| JP | 2001339386 A | 12/2001 |

OTHER PUBLICATIONS

International Search Report mailed on Jun. 16, 2011 in PCT/CN2011/071719 in 4 pages.
International Preliminary Report on Patentability issued on Dec. 10, 2012 in PCT/CN2011/071719 in 5 pages (English translation in 5 pp.).

* cited by examiner

METHOD FOR UPDATING AND GENERATING AIR INTERFACE KEY AND RADIO ACCESS SYSTEM

CROSS-REFERENCE TO RELATED APPLICATIONS

This application is the U.S. National Phase application under 35 U.S.C. §371 of International Application PCT/CN2011/071719, filed Mar. 11, 2011, which claims priority to Chinese Application 201010202417.8, filed Jun. 7, 2010.

FIELD OF THE INVENTION

The disclosure relates to the field of communication, and in particular to a method for updating and generating an air interface key and a radio access system.

BACKGROUND OF THE INVENTION

The 3rd Generation Partnership Project (3GPP) employs Orthogonal Frequency Division Multiplexing (shorted for OFDM) and Multiple-Input Multiple-Output (shorted for MIMO) technologies in Release7 to complete the future evolution path HSPA+ of High Speed Downlink Packet Access (HSDPA) and High Speed Uplink Packet Access (HSUPA). The HSPA+ is an enhancement technology of 3GPP HSPA (including HSDPA and HSUPA). The HSPA+ provides a way of smooth evolution from the HSPA to Long Term Evolution (LTE) with low complexity and low cost for HSPA operators.

Compared with HSPA, in HSPA+ system architecture, functions of the Radio Network Controller (shorted for RNC) are given to the Node B to form completely flat radio access network architecture, shown in FIG. 1. In this case, the Node B integrating all functions of the RNC is called the evolved HSPA Node B, or shorted for enhanced Node B (Node B+). SGSN+ is the upgraded Service General Packet Radio System (GPRS) Support Node (SGSN) which can support the functions of the HSPA+. ME+ is the user terminal equipment which can support the functions of the HSPA+. The evolved HSPA system can use the air interface of the version of 3GPP Rel-5 and later, without having any modification for HSPA services of the air interface. After this solution is employed, each Node B+ becomes a node equivalent to the RNC, and has an Iu-PS interface to be able to directly connect with a PS Core Network (CN) (as SGSN and GGSN shown in FIG. 1). The Iu-PS user plane ends at the SGSN. In the above, if the network supports a direct tunnel function, the Iu-PS user plane may also end at the Gateway GPRS Support Node (GGSN). Communication between the evolved HSPA Nodes B is performed through an Iur interface. Node B+ has the capability of independent networking, and supports complete mobility functions, including inter-system and intra-system handoff.

As the network is flattened, the user plane data may reach the GGSN directly without passing through the RNC. It means that ciphering and integrity protection function of the user plane must be shifted forward to Node B+. The present HSPA+ security key hierarchy structure is shown in FIG. 2. In the above, the definition of Key (K, the root key), Ciphering Key (CK) and Integrity Key (IK) is completely consistent to that in a traditional Universal Mobile Telecommunications System (UMTS). That is, K is a key saved in an Authentication Center (AuC) and a Universal Subscriber Identity Module (USIM). In the disclosure, CK and IK are called the traditional keys. The traditional keys CK and IK are a ciphering key and an integrity key calculated from K when Authentication and Key Agreement (AKA) is performed between the User Equipment and the Home Subscriber Server (HSS). In the UMTS, the RNC uses the traditional air interface keys CK and IK to perform data ciphering and integrity protection. As functions of the RNC are all given to the Node B+ in the HSPA+ architecture, both ciphering and deciphering need to be performed at the Node B+. But, the Node B+ is in an insecure environment with low security. Therefore, a key hierarchy similar to Evolved Universal terrestrial Radio Access Network (E-UTRAN), i.e., an UTRAN key hierarchy, is introduced to the HSPA+. In the UTRAN key hierarchy structure, the intermediate key $K_{RNC}$ (also called $K_{ASMEU}$) is a key newly introduced to the HSPA+, which is generated by respective derivation of CK and IK at the ME+ and the core network node (SGSN+ or MSC+). Further, the core network node sends the $K_{RNC}$ to the RNC+. According to the intermediate key $K_{RNC}$, the ME+ and the RNC+ generate air interface keys $CK_U$ and $IK_U$ respectively, which are called enhanced keys. In the above, the enhanced key $CK_U$ is used for ciphering user plane data and control plane signaling, and the enhanced key $IK_U$ is used for performing integrity protection for the control plane signaling.

At present, there is another enhanced security key hierarchy structure shown in FIG. 3. In this key architecture, enhanced keys $CK_U$ and $IK_U$ are directly generated from traditional keys CK and IK at the ME+ and the core network node (SGSN+ or MSC+) respectively. The core network node sends the enhanced keys $CK_U$ and $IK_U$ to the RNC+.

In the UMTS, the concept of Serving RNC (SRNC)/Drift RNC (DRNC) is produced due to the introduction of the Iur interface. Both SRNC and DRNC are logic concepts for a specific User Equipment (UE). Simply, for a certain UE, the RNC which is directly connected with the Core Network (CN) and controls all resources of the UE is called the SRNC of the UE. The RNC which is not connected with the CN and just provides resources for the UE is called the DRNC of the UE. The UE, which is in connected status, must have but only one SRNC, and may have 0 or multiple DRNCs.

In the UMTS, SRNC relocation is a process in which the SRNC of the UE changes from one RNC to another RNC. According to different positions of the UE before and after the relocation, there can be two types of relocation: the static relocation and concomitant relocation.

Concomitant relocation is a process in which the UE switches to a target RNC from the SRNC by hard handoff and the Iu interface changes simultaneously, shown in FIG. 4. As the relocation process needs the participation of the UE, it is also called the UE involved relocation.

The condition for the static relocation is that the UE accesses but only from one DRNC. As the relocation process needs no participation of the UE, it is also called the UE not-involved relocation. After the relocation, the connection of the Iur interface is released, the Iu interface relocates, and the old DRNC becomes to the SRNC, shown in FIG. 5. The static relocation is caused by soft handoff. Due to the Iur interface, the relocation starts after all radio links are linked to the DRNC.

During the SRNC relocation process, when a source RNC decision triggers the SRNC relocation process, the source RNC is very likely to be unable to determine whether the target RNC has an enhanced security function. Usually, the target RNC notifies the UE with its own security capability by the first downlink message sent to the UE (it may be transferred by the source RNC). The UE notifies the target RNC with its own security capability in the first uplink message sent to the target RNC. If the source RNC supports the enhanced security, in the preparation stage of the SRNC relocation, the source RNC may notify the target RNC with the enhanced security capability supported by the UE. In this way, the target RNC may know the security capability of the UE early, which is beneficial for judging whether the enhanced security mechanism or traditional security mechanism should be used.

In the concomitant relocation process, as the UE participates in the whole SRNC relocation process, the downlink message carrying the security capability of the target RNC is forwarded to the UE by the source RNC. Hence, the message is protected by a ciphering key between the source RNC and the UE. After receiving the message, the UE is able to determine which ciphering key should be used for deciphering. But, in the static relocation process, as the downlink message carrying the security capability of the target RNC is directly sent to the UE by the target RNC, the message should be protected by a ciphering key between the target RNC and the UE. However, after receiving the message, the UE is unable to know the security capability of the target RNC. Therefore the UE is unable to determine whether the traditional ciphering key or the enhanced ciphering key should be used to decipher the message.

At present, there is a proposed solution that, for static SRNC relocation, the source RNC first performs a intra-RNC SRNC relocation. That is, in this case the target RNC and the source RNC are the same SRNC. During this process, the SRNC updates the enhanced key. As the target RNC is the source RNC and the UE knows the security capability of the source RNC, after receiving the first downlink message sent by the target RNC (here, the source RNC), the UE is able to determine whether the traditional air interface key or the enhanced air interface key should be used to decipher the message. Then, the source RNC performs the inter-RNC relocation. During this process, the air interface key is not updated according to the UMTS mechanism. That is, the source RNC directly sends the enhanced keys $IK_U$ and $CK_U$ to the target RNC. In this way, as $IK_U$ and $CK_U$ have been updated during the intra-RNC relocation process, the purpose of updating the air interface keys during static SRNC relocation is realized.

However, in the above solution, if the static relocation is triggered by the cell update or UMTS Registration Area (URA) update process, if the UE moves too fast, the UE is very likely to be disconnected from the source RNC when the intra-RNC relocation is not completed. Thus the SRNC relocation time is prolonged and the UE disconnection risk is increased.

SUMMARY OF THE INVENTION

The disclosure provides a method for updating and generating an air interface key and a radio access system, so as to solve the problem that when the static relocation is triggered by the cell update or URA update process, the UE moves too fast, causing that the SRNC relocation time is prolonged and the UE disconnection risk is increased.

According to one aspect of the disclosure, a method for updating air interface key is provided, comprising: a source Radio Network Controller (RNC) completing a static relocation towards a target RNC; the target RNC performing an intra-Serving-RNC (SRNC) relocation; and during the intra-SRNC relocation, the target RNC updating an enhanced key of the target RNC according to a key received from the source RNC or a core network node.

Preferably, before the step that the source RNC completes the static relocation towards the target RNC, the method further comprises: the source RNC performing the static relocation towards the target RNC; and during the static relocation, the source RNC directly sending a current key used by the source RNC to the target RNC, and the target RNC using the current key to communicate with a User Equipment (UE).

Preferably, the step that the target RNC performs the intra-SRNC relocation comprises: the target RNC performing a SRNC relocation towards a second target RNC, wherein the target RNC and the second target RNC are the same RNC.

Preferably, the step that the target RNC updates the enhanced key of the target RNC according to the key received from the source RNC or the core network node comprises: the target RNC using a deformation intermediate key sent by the source RNC or the core network node to derive and update the enhanced key of the target RNC, wherein the deformation intermediate key is generated by the core network node using a saved traditional key and a current deformation intermediate key after a last Serving RNC (SRNC) static relocation is completed successfully, and is sent to the target RNC by the core network node.

Preferably, before the step that the source RNC completes the static relocation towards the target RNC, the method further comprises: the source RNC sending a relocation demand message to the core network node, wherein the relocation demand message comprises a current enhanced key of the source RNC, wherein the current enhanced key comprises a current enhanced integrity key $IK_U$ and/or a current enhanced ciphering key $CK_U$; and the core network node sending a relocation request message to the target RNC, wherein the relocation request message comprises the current enhanced key of the source RNC.

Preferably, the step that the source RNC sends the relocation demand message to the core network node comprises: the source RNC putting the current enhanced integrity key $IK_U$ in an IK field of the relocation demand massage, and/or putting the current enhanced ciphering key $CK_U$ in a CK field of the relocation demand message, and then sending the relocation demand message to the core network node; and the step that the core network node sends the relocation request message to the target RNC comprises: the core network node putting the current enhanced integrity key $IK_U$ sent by the source RNC in the IK field of the relocation request massage, and/or putting the current enhanced ciphering key $CK_U$ in the CK field of the relocation request message, and then sending the relocation request message to the target RNC.

Preferably, after the step that the core network node sends the relocation request message to the target RNC, the method further comprises: if the target RNC does not support an enhanced security mode, the content in the IK field of the relocation request message being taken as a traditional integrity key IK and the content in the CK field of the relocation request message being taken as a traditional ciphering key CK; and if the target RNC supports the enhanced security mode, the content in the IK field of the relocation request message being taken as the $IK_U$ and the content in the CK field of the relocation request message being taken as the $CK_U$.

Preferably, before the step that the source RNC completes the static relocation towards the target RNC, the method further comprises: the source RNC sending an enhanced relocation request message to the target RNC, wherein the enhanced relocation request message comprises a current enhanced key of the source RNC, wherein the current enhanced key comprises a current enhanced integrity key $IK_U$ and/or a current enhanced ciphering key $CK_U$.

Preferably, the step that the source RNC sends the enhanced relocation request message to the target RNC comprises: the source RNC putting the current enhanced integrity key $IK_U$ in an IK field of the enhanced relocation request massage, and/or putting the current enhanced ciphering key $CK_U$ in a CK field of the enhanced relocation request message, and then sending the enhanced relocation request massage to the target RNC.

Preferably, after the step that the source RNC sends the enhanced relocation request message to the target RNC, the method further comprises: if the target RNC does not support an enhanced security mode, the content in the IK field of the enhanced relocation request message being taken as a traditional integrity key IK and the content in the CK field of the enhanced relocation request message being taken as a traditional ciphering key CK; and if the target RNC supports the enhanced security mode, the content in the IK field of the enhanced relocation request message being taken as the $IK_U$, and the content in the CK field of the enhanced relocation request message being taken as the $CK_U$.

Preferably, after the step that the core network node sends the relocation request message to the target RNC, the method further comprises: the target RNC sending a relocation acknowledge message to the UE, wherein the relocation acknowledge message comprises security capability indication information of the target RNC; and the UE sending an acknowledge response message to the target RNC, wherein the acknowledge response message comprises security capability indication information of the UE.

Preferably, the step that the target RNC performs the intra-SRNC relocation comprises: the target RNC sending a relocation acknowledge message to the UE, wherein the relocation acknowledge message comprises a network next hop chaining counter (NCC) of the core network node; and the UE judging whether a terminal NCC corresponding to the currently activated key is equal to the network NCC; if yes, the UE updating an enhanced key of the UE according to a deformation intermediate key which is saved in advance and is corresponding to the terminal NCC; and if not, the UE calculating a deformation intermediate key and progressively increasing the corresponding terminal NCC till the terminal NCC is equal to the network NCC, and calculating and updating the enhanced key of the UE according to the deformation intermediate key.

Preferably, the method for updating air interface key further comprises: the target RNC completing the intra-SRNC relocation; and the core network node calculating a next hop deformation intermediate key according to a saved traditional key and a current deformation intermediate key, and sending the next hop deformation intermediate key to the target RNC.

Preferably, before or after the step that the core network node calculates the next hop deformation intermediate key according to the saved traditional key and the current deformation intermediate key, the method further comprises: the core network node progressively increasing the network NCC.

Preferably, the step that the target RNC updates the enhanced key of the target RNC according to the key received from the source RNC or the core network node comprises: the target RNC using a saved current enhanced key to update the enhanced key of the target RNC, wherein the current enhanced key is the current enhanced key of the source RNC.

Preferably, the step that the target RNC uses the saved current enhanced key to update the enhanced key of the target RNC comprises: the target RNC using the saved enhanced key which is received from the source RNC to update the enhanced key of the target RNC according to formulas of: $IK_U = F (IK_{U\_old}, Parameter)$; $CK_U = F (CK_{U\_old}, Parameter)$; or, $(IK_U, CK_U) = F (IK_{U\_old} \| CK_{U\_old}, Parameter)$; wherein F is any key generation function, Parameter is a parameter, $IK_{U\_old}$ and $CK_{U\_old}$ are the current enhanced keys of the target RNC, $IK_U$ and $CK_U$ are updated enhanced keys of the target RNC, and symbol $\|$ is concatenation.

Preferably, the method for updating air interface key further comprises: the target RNC sending a relocation acknowledge message to the UE; the UE receiving the relocation acknowledge message, and using the saved current enhanced key to update an enhanced key of the UE according to formulas of: $IK_U = F (IK_{U\_old}, Parameter)$; $CK_U = F (CK_{U\_old}, Parameter)$; or, $(IK_U, CK_U) = F (IK_{U\_old} \| CK_{U\_old}, Parameter)$; wherein F is any key generation function, Parameter is a parameter, $IK_{U\_old}$ and $CK_{U\_old}$ are current enhanced keys of the UE, $IK_U$ and $CK_U$ are updated enhanced keys of the UE, and symbol $\|$ is concatenation; and the UE sending an acknowledge response message to the target RNC.

Preferably, the step that the target RNC updates the enhanced key of the target RNC according to the key received from the source RNC or the core network node comprises: the target RNC using an enhanced key sent by the source RNC or the core network node to update the enhanced key of the target RNC, wherein the enhanced key from the source RNC or the core network node is generated by the core network node using a saved traditional key and a current enhanced key after a last SRNC static relocation is completed successfully, and is sent to the target RNC by the core network node.

Preferably, the method for updating air interface key further comprises: the target RNC sending a relocation acknowledge message to the UE, wherein the relocation acknowledge message comprises a network NCC of the core network node; and a UE judging whether a terminal NCC corresponding to a currently activated key is equal to the network NCC; if yes, the UE using an enhanced key which is saved in advance and is corresponding to the terminal NCC; and if not, the UE calculating an enhanced key and progressively increasing the corresponding terminal NCC till the terminal NCC is equal to the network NCC.

Preferably, the method for updating air interface key further comprises: the target RNC completing the intra-SRNC relocation; and the core network node calculating a next hop enhanced key according to the saved traditional key and the current enhanced key, and sending the next hop enhanced key to the target RNC.

Preferably, before or after the step that the core network node calculates the next hop enhanced key according to the saved traditional key and the current enhanced key, the method further comprises: the core network node progressively increasing the network NCC.

Preferably, the step that the target RNC updates the enhanced key of the target RNC according to the key received from the core network node comprises: the core network node using a traditional key saved in the core network node and a current enhanced key to calculate a next hop enhanced key, and sending the next hop enhanced key to the target RNC; and the target RNC using the next hop enhanced key to update the enhanced key of the target RNC.

Preferably, in the method for updating air interface key, the source RNC is a source RNC supporting an enhanced security, and/or the target RNC is a target RNC supporting the enhanced security.

According to another aspect of the disclosure, a radio access system is also provided, comprising: a source Radio Network Controller (RNC), configured to complete a static relocation towards a target RNC; and the target RNC, configured to, after the source RNC completes the static relocation towards the target RNC, perform an intra-Serving-RNC (SRNC) relocation, and during the intra-SRNC relocation, update an enhanced key of the target RNC according to a key received from the source RNC or a core network node.

Preferably, the radio access system further comprises: the core network node, configured to use a saved traditional key and a current deformation intermediate key to generate a next hop deformation intermediate key, and send the current deformation intermediate key to the target RNC; or the core network node, configured to use a saved traditional key and a current deformation intermediate key to generate a next hop enhanced key, and send the next hop enhanced key to the target RNC.

Preferably, the core network node further comprises a network next hop chaining counter (NCC), configured to count number of times of generating the next hop deformation intermediate key or the next hop enhanced key.

Preferably, the radio access system further comprises: a User Equipment (UE), configured with a terminal NCC, wherein the UE comprises: a receiving module, configured to receive a relocation acknowledge message sent by the target RNC, wherein the relocation acknowledge message comprises a network NCC of the core network node; a judging module, configured to judge whether the terminal NCC is equal to the network NCC; a positive result module, configured to, if the result of the judgment of the judging module is yes, update an enhanced key of the UE according to a deformation intermediate key which is saved in advance and is corresponding to the terminal NCC; or, use an enhanced key which is saved in advance and is corresponding to the terminal NCC; and a negative result module, configured to, if the result of the judgment of the judging module is no, calculate a deformation intermediate key and progressively increase the corresponding terminal NCC till the terminal NCC is equal to the network NCC, and calculate and update the enhanced key of UE according to the deformation intermediate key; or, calculate the enhanced key and progressively increase the corresponding terminal NCC till the terminal NCC is equal to the network NCC.

Preferably, in the radio access system, the source RNC is a source RNC supporting an enhanced security, and/or the target RNC is a target RNC supporting the enhanced security.

According to still another aspect of the disclosure, a method for generating air interface key is also provided, comprising: a source Radio Network Controller (RNC) and a User Equipment (UE) respectively using an enhanced integrity key $IK_U$ and/or an enhanced ciphering key $CK_U$ to generate a next hop enhanced key $IK_U$ and/or a next hop enhanced key $CK_U$.

Preferably, the step that the source RNC and the UE respectively use the enhanced integrity key $IK_U$ and/or the enhanced ciphering key $CK_U$ to generate the next hop enhanced key $IK_U$ and/or the next hop enhanced key $CK_U$ comprises: the source RNC and the UE respectively using the enhanced ciphering key $CK_U$ and/or the enhanced integrity key $IK_U$ to generate the next hop enhanced key $CK_U$ and/or the next hop enhanced key $IK_U$ according to formulas of: $IK_U = F(IK_{U\_}old, Parameter)$; $CK_U = F(CK_{U\_}old, Parameter)$; or, $(IK_U, CK_U) = F(IK_U \| CK_U, Parameter)$; wherein F is any key generation function, Parameter is a parameter, $IK_{U\_}old$ and $CK_{U\_}old$ are current enhanced keys of the source RNC and the UE, $IK_U$ and $CK_U$ are the next hop enhanced keys of the source RNC and the UE, and symbol $\|$ is concatenation.

Preferably, the Parameter is a FRESH random number generated by the source RNC, and/or a target RNC identifier.

This disclosure employs a method that the relocation from the source RNC to the target RNC is performed first, the intra-relocation of the target RNC is performed later and the enhanced air interface key is updated during the intra-relocation of the target RNC. The problems of long SRNC relocation time and high UE disconnection risk, which are caused as the UE moves too fast when the static relocation is triggered by the cell update or URA update process, are avoided effectively. Through the disclosure, not only the enhanced air interface key can be updated during the SRNC static relocation, but also the time delay of the SRNC relocation process is not increased, and security and efficiency of the system are improved.

Furthermore, the disclosure can be widely applied in various SRNC static relocation scenes. This solution can solve the problems that the SRNC relocation time is prolonged and the UE disconnection risk is increased, which are caused as the UE moves too fast when the static relocation is triggered by the cell update or URA update process. This solution may also be applied in any other SRNC static relocation scenes, so as to improve security and efficiency of the system while updating the enhanced air interface key during the SRNC static relocation.

BRIEF DESCRIPTION OF THE DRAWINGS

Drawings described herein are provided for further understanding of the disclosure and form one part of the application. The exemplary embodiments of the disclosure and descriptions thereof are used for explaining the disclosure and do not constitute improper limitation on the disclosure. In the drawings.

DETAILED DESCRIPTION OF THE EMBODIMENTS

The disclosure will be described in detail hereinafter with reference to drawings and in conjunction with embodiments.

It should be noted that the embodiments in the application and features in the embodiments may be combined with each other if not conflicted.

Figure 6:
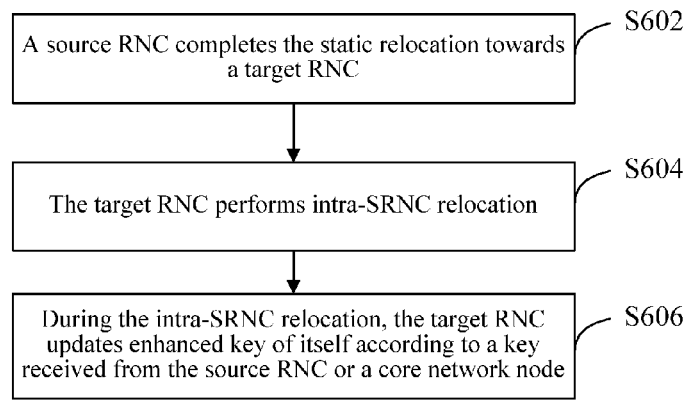
FIG. 6 shows a flowchart of steps of a method for updating air interface key according to embodiment 1 of the disclosure.

With reference to FIG. 6, a flowchart of steps of a method for updating air interface key according to embodiment 1 of the disclosure is shown, comprising the following steps.

Step S602: A source RNC completes the static relocation towards a target RNC.

In the above, the source RNC and the target RNC in the embodiment may be the RNC+. That is, the source RNC is a source RNC+, and the target RNC is a target RNC+.

In this step, the static relocation from the source RNC (source RNC+) to the target RNC (target RNC+) follows the traditional UMTS mechanism. Therefore, the source RNC (source RNC+) performs the same SRNC relocation flow as the UMTS. That is, the source RNC (source RNC+) directly sends an enhanced air interface key to the target RNC (target RNC+). During this process, the enhanced key is not updated.

In this step, if the target RNC supports the enhanced security, the target RNC (target RNC+) uses a key received from the source RNC (source RNC+) or a core network node as the enhanced key $IK_U$ and/or $CK_U$, and continues to perform the following steps. If the target RNC does not support the enhanced security, the target RNC uses a key received from the source RNC (source RNC+) or a core network node as the traditional key IK and/or CK, and performs operations according to those defined in the traditional UMTS. The traditional key and the enhanced key are distinguished for the target RNC supporting different security modes, so as to meet different relocation demands.

Step S604: The target RNC performs the intra-SRNC relocation.

After the source RNC (source RNC+) is relocated to the target RNC (target RNC+), the target RNC (target RNC+) performs the intra-relocation. That is, in this case, the source RNC and the target RNC are the same RNC.

Step S606: During the intra-SRNC relocation, the target RNC (target RNC+) updates the enhanced key of itself according to a key received from the source RNC (source RNC+) or a core network node.

In the related technologies, when the static relocation is triggered by the cell update or URA update process, if the UE moves too fast, the UE is very likely to be disconnected from the source RNC when the intra-RNC relocation is not completed. Thus the SRNC relocation time is prolonged and the UE disconnection risk is increased. This embodiment employs a method that the relocation from the source RNC to the target RNC is performed first, the intra-relocation of the target RNC is performed later and the enhanced air interface key is updated during the intra-relocation of the target RNC. The problems of long SRNC relocation time and high UE disconnection risk, which are caused as the UE moves too fast when the static relocation is triggered by the cell update or URA update process, are avoided effectively. Not only the enhanced air interface key during the SRNC static relocation can be updated, but also the time delay of the SRNC relocation process is not increased, and security and efficiency of the system are improved.

Figure 1:
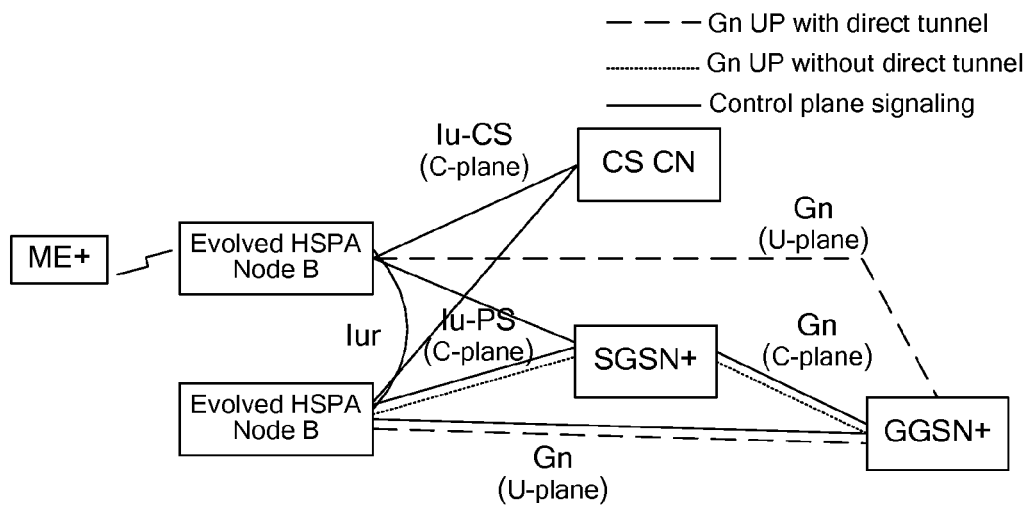
FIG. 1 shows an architecture diagram of a radio access network employing the HSPA+ technology according to the related technologies.
Figure 2:
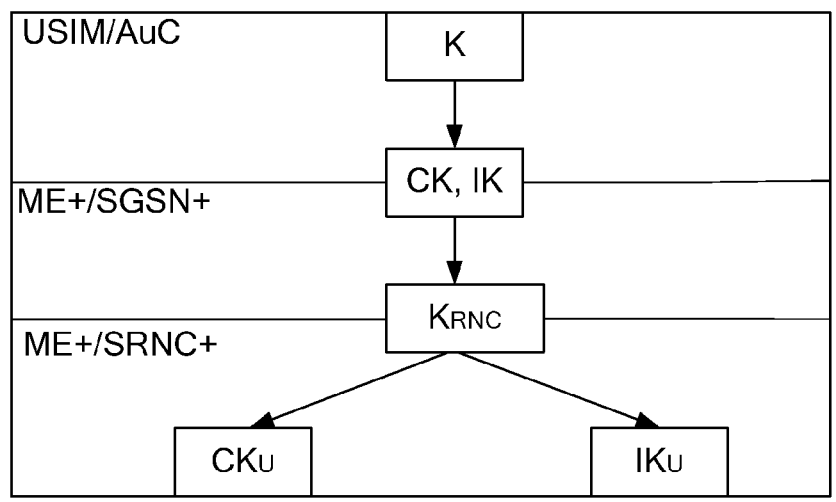
FIG. 2 shows a diagram of an HSPA+ security key hierarchy structure according to the related technologies.
Figure 7:
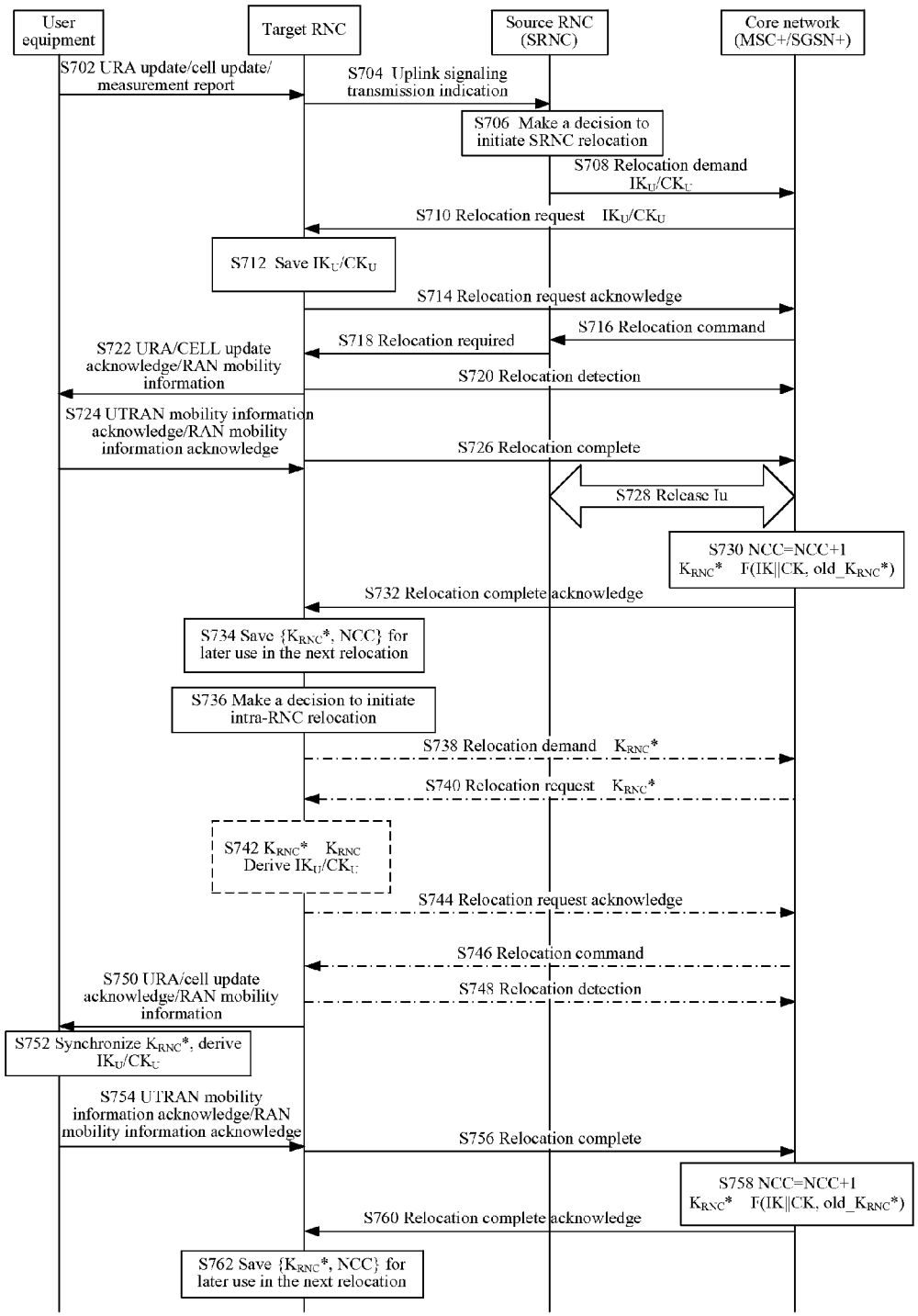
FIG. 7 shows the flowchart of updating an air interface key in a radio communication system according to embodiment 2 of the disclosure.

With reference to FIG. 7, the flowchart of updating an air interface key in a radio communication system according to embodiment 2 of the disclosure is shown. In the embodiment, based on the enhanced key architecture shown in FIG. 2, after each time of successful SRNC relocation process, the core network node derives a next hop deformation intermediate key $K_{RNC}^*$ according to the traditional keys IK and CK saved in the core network node and the current deformation intermediate key $K_{RNC}^*$, and sends the next hop deformation intermediate key $K_{RNC}^*$ to the target RNC to be saved for later use in the next SRNC relocation. In the next SRNC relocation, the source RNC (that is, the target RNC during the last SRNC relocation process) sends the saved deformation intermediate key $K_{RNC}^*$ to the target RNC, and the target RNC derives the updated enhanced keys $IK_U$ and $CK_U$ based on the received deformation intermediate key $K_{RNC}^*$ and/or other parameters (for example, the algorithm identifier).

The embodiment comprises the following steps.

Step S702: The UE sends a URA update message or cell update message or measurement report message to the UTRAN.

Step S704: The target RNC sends an uplink signaling transmission indication message to the source RNC of the UE in response to receiving the URA update message or cell update message or measurement report message from the UE.

Step S706: The source RNC makes a decision to initiate the SRNC relocation process.

Step S708: The source RNC determines what is triggered is a static SRNC relocation, and the source RNC performs the same SRNC relocation flow as the traditional UMTS. That is, the source RNC sends a relocation demand message to the core network node (SGSN+ or MSC+), and the relocation demand message carries parameters: enhanced keys $IK_U$ and $CK_U$.

Step S710: The core network node sends a relocation request message to the target RNC, wherein the relocation request message carries parameters: enhanced key $IK_U$ and/or $CK_U$.

In step S708-step S710, if the source RNC does not support the enhanced security, the key sent to the target RNC by the source RNC is: the traditional air interface key IK and/or CK.

If the source RNC supports the enhanced security, the source RNC directly sends the enhanced air interface key $IK_U$ and/or $CK_U$ to the target RNC. Optionally, the source RNC puts the enhanced air interface key $IK_U$ and/or $CK_U$ in the IK and/or CK field of a transparent container from the source RNC to the target RNC for sending.

Preferably, the relocation demand message and the relocation request message carry: an indication through which the source RNC indicates the target RNC to perform security operations defined in the traditional UMTS, and thus not to update the enhanced keys. For example, in the embodiment, the NCC fields in the relocation demand message and the relocation request message may be set to be null or a certain special value.

If the source RNC and the target RNC are under different core network nodes, the relocation demand message and the relocation request message need to be transferred through a plurality of core network nodes.

Through the relocation demand message and the relocation request message, the effective transfer of keys and other parameters required by relocation is realized.

Step S712: The target RNC saves the key received from the source RNC.

If the key received by the target RNC is in the IK and/or CK field of the relocation request message sent by the core network node, the target RNC may take it as the enhanced key $IK_U$ and/or $CK_U$ (the target RNC supports the enhanced security mode), or take it as the traditional key IK and/CK (the target RNC does not support the enhanced security mode).

Step S714: The target RNC sends a relocation request acknowledge message to the core network node.

If the source RNC and the target RNC are under different core network nodes, the message needs to be transferred by the plurality of core network nodes.

Step S716: The core network node sends a relocation command message to the source RNC.

Step S718: The source RNC sends a relocation required message to the target RNC.

Step S720: The target RNC sends a relocation detection message to the core network node.

Step S722: The target RNC sends a cell update acknowledge message or URA update acknowledge message or RAN mobility information message to the UE, wherein the message carries the indication information of the security capability of the target RNC.

Step S724: The UE sends a UTRAN mobility information acknowledge message or RAN mobility information acknowledge message to the target RNC, wherein the message carries the indication information of the security capability of the UE.

Through step S722-step S724, the target RNC and the UE respectively know each other's security capability.

Step S726: The target RNC sends a relocation complete message to the core network node.

Step S728: The source RNC releases the Iur interface with the core network node.

This step and step S730 may be performed without any specific sequence.

If the target RNC and/or the UE does not support the enhanced security, the flow ends here. If both the target RNC and the UE support the enhanced security, and the source RNC does not support the enhanced security, the core network node makes a decision to initiate AKA and security mode establishment processes, or only initiate security mode establishment process, to generate an enhanced key. If both the target RNC and the UE support the enhanced security, and the source RNC also supports the enhanced security, the process continues to step S730.

Step S730: After knowing that the SRNC relocation is successfully completed, the core network node calculates the next hop deformation intermediate key $K_{RNC}^*$ based on the saved traditional keys IK and CK and the current deformation intermediate key $K_{RNC}^*$.

As a preferred solution, in the embodiment, the core network node maintains a network next hop chaining counter (NCC) to count the number of times of calculating the deformation intermediate key $K_{RNC}^*$. When knowing that the SRNC relocation is successfully completed, the core network node progressively increases the network NCC, and calculates the next hop deformation intermediate key $K_{RNC}^*$ corresponding to the progressively increased network NCC. Or, the core network node may also calculate the next hop deformation intermediate key $K_{RNC}^*$ based on IK, CK and the current deformation intermediate key $K_{RNC}^*$ first, and then progressively increase the network NCC.

Step S732: The core network node sends a relocation complete response message to the target RNC, wherein the message carries the following parameters: network NCC and the next hop deformation intermediate key $K_{RNC}^*$ corresponding to the network NCC.

Step S734: The target RNC saves the received network NCC and the next hop deformation intermediate key $K_{RNC}^*$.

Step S736: The target RNC makes a decision to initiate the intra-RNC relocation.

Step S738: The target RNC sends a relocation demand message to the core network node, wherein the message carries parameters: deformation intermediate key $K_{RNC}^*$ and network NCC.

Step S740: The core network node sends a relocation request message to the target RNC, wherein the message carries parameters: deformation intermediate key $K_{RNC}^*$ and network NCC.

Step S742: The target RNC derives and calculates the enhanced integrity key $IK_U$ and/or enhanced ciphering key $CK_U$ according to the deformation intermediate key $K_{RNC}^*$.

Optionally, the target RNC makes the intermediate key $K_{RNC}$ equal to the deformation intermediate key $K_{RNC}^*$, and calculates the updated $IK_U$ and/or $CK_U$ based on the intermediate key $K_{RNC}$.

Step S744: The target RNC sends a relocation request acknowledge message to the core network node.

Step S746: The core network node sends a relocation command message to the target RNC.

Step S748: The target RNC sends a relocation detection message to the core network node.

In the embodiment, step S738-step S748 are optional steps.

Step S750: The target RNC sends a cell update acknowledge message or URA update acknowledge message or RAN mobility information message to the UE, wherein the message carries a parameter: network NCC.

Step S752: The UE updates the integrity key $IK_U$ and/or ciphering key $CK_U$ based on the deformation intermediate key $K_{RNC}^*$.

Optionally, the UE makes the intermediate key $K_{RNC}$ equal to the deformation intermediate key $K_{RNC}^*$, and calculates the updated $IK_U$ and/or $CK_U$ based on the intermediate key $K_{RNC}$.

In this step, the UE maintains a terminal NCC, when receiving the network NCC, the UE judges whether the terminal NCC corresponding to the current activated enhanced key is equal to the network NCC. If the terminal NCC is equal to the network NCC, the UE updates the enhanced integrity key $IK_U$ and/or enhanced ciphering key $CK_U$ according to the deformation intermediate key $K_{RNC}^*$ which is saved in the UE and is corresponding to the terminal NCC. If the terminal NCC is not equal to the network NCC, the UE calculates the deformation intermediate key $K_{RNC}^*$ and progressively increases the corresponding terminal NCC till the terminal NCC is equal to the network NCC, and updates the enhanced integrity key $IK_U$ and/or ciphering key $CK_U$ according to the deformation intermediate key $K_{RNC}^*$. The UE keeps the keys consistent to keys of the target RNC by using the network NCC and the terminal NCC.

Step S754: The UE sends a UTRAN mobility information acknowledge message or RAN mobility information acknowledge message to the target RNC.

Step S756: The target RNC sends a relocation complete message to the core network node.

Step S758: The core network node progressively increases the network NCC after knowing that the SRNC relocation is completed successfully; and the core network node calculates the next hop deformation intermediate key $K_{RNC}^*$ corresponding to the progressively increased network NCC based on IK, CK and the current deformation intermediate key $K_{RNC}^*$.

Step S760: The core network node sends a relocation complete response message to the target RNC, wherein the message carries the following parameters: network NCC and the next hop deformation intermediate key $K_{RNC}^*$ corresponding to the network NCC.

Step S762: The target RNC saves the received network NCC and the next hop deformation intermediate key $K_{RNC}^*$.

In the above, step S756-step S762 are optional steps.

Figure 8:
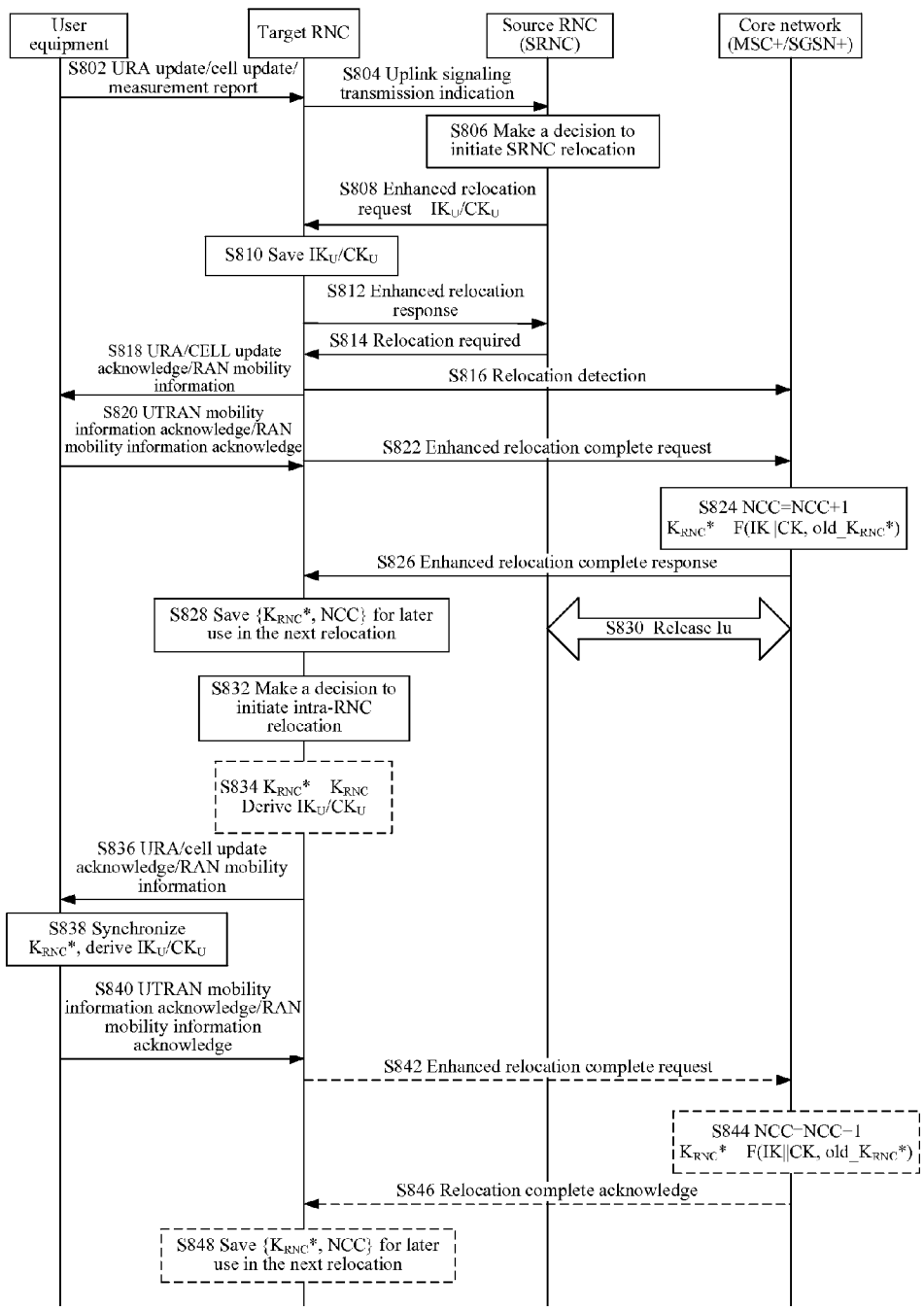
FIG. 8 shows the flowchart of updating an air interface key in a radio communication system according to embodiment 3 of the disclosure.

With reference to FIG. 8, the flowchart of updating an air interface key in a radio communication system according to embodiment 3 of the disclosure is shown. This embodiment is based on the enhanced key architecture shown in FIG. 2. After each time of successful SRNC relocation process, the core network node derives a next hop deformation intermediate key $K_{RNC}^*$ according to the traditional keys IK and CK saved in the core network node and the current deformation intermediate key $K_{RNC}^*$, and sends the next hop deformation intermediate key $K_{RNC}^*$ to the target RNC to be saved for later use in the next SRNC relocation. In the next SRNC relocation, the source RNC (that is, the target RNC+ during the last SRNC relocation process) sends the saved deformation intermediate key $K_{RNC}^*$ to the target RNC, and the target RNC derives the updated enhanced keys $IK_U/CK_U$ based on the received deformation intermediate key $K_{RNC}^*$ and/or other parameters (for example, algorithm identifier).

The embodiment comprises the following steps.

Step S802: The UE sends a URA update message or cell update message or measurement report message to the UTRAN.

Step S804: The target RNC sends an uplink signaling transmission indication message to the source RNC of the UE in response of receiving the URA update message or cell update message or measurement report message from the UE.

Step S806: The source RNC makes a decision to initiate the SRNC relocation process.

Step S808: The source RNC determines what is triggered is a static SRNC relocation, and the source RNC performs the same SRNC relocation flow as the traditional UMTS. That is, the source RNC sends an enhanced relocation request message to the target RNC, wherein the message carries parameters of: enhanced keys $IK_U$ and $CK_U$.

In this step, if the source RNC does not support the enhanced security, the key sent to the target RNC by the source RNC is: the traditional air interface key IK and/or CK.

If the source RNC supports the enhanced security, the source RNC directly sends the enhanced air interface key $IK_U$ and/or $CK_U$ to the target RNC. Optionally, the source RNC puts the enhanced air interface key $IK_U$ and/or $CK_U$ in the IK and/or CK field of a transparent container from the source RNC to the target RNC for sending.

Preferably, the enhanced relocation request message carries: an indication through which the source RNC indicates the target RNC to perform security operations defined in the traditional UMTS in order to indicate the target RNC not to update the enhanced keys. For example, in the embodiment, the NCC fields in the relocation demand message and the relocation request message may be set to be null or a certain special value.

Step S810: The target RNC saves the key received from the source RNC.

If the key received by the target RNC is in the IK and/or CK field of the relocation request message sent by the core network node, the target RNC may take it as the enhanced key $IK_U$ and/or $CK_U$ (the target RNC supports the enhanced security mode), or take it as the traditional key IK and/CK (the target RNC does not support the enhanced security mode).

Step S812: The target RNC sends an enhanced relocation response message to the source RNC.

Step S814: The source RNC sends a relocation required message to the target RNC.

Step S816: The target RNC sends a relocation detection message to the core network node.

Step S818: The target RNC sends a cell update acknowledge message or URA update acknowledge message or RAN mobility information message to the UE, wherein the message carries the indication information of the security capability of the target RNC.

Step S820: The UE sends a UTRAN mobility information acknowledge message or RAN mobility information acknowledge message to the target RNC, wherein the message carries the indication information of the security capability of the UE.

Through step S818 and step S820, the target RNC and the UE respectively know each other's security capability.

Step S822: The target RNC sends an enhanced relocation complete request message to the core network node.

Step S824: After knowing that the SRNC relocation is successfully completed, the core network node calculates the next hop deformation intermediate key $K_{RNC}^*$ based on the saved traditional keys IK and CK and the current deformation intermediate key $K_{RNC}^*$.

As a preferred solution, in the embodiment, the core network node maintains a network NCC to count the number of times of calculating the deformation intermediate key $K_{RNC}^*$. When knowing that the SRNC relocation is successfully completed, the core network node progressively increases the network NCC, and calculates the next hop deformation intermediate key $K_{RNC}^*$ corresponding to the progressively increased network NCC; or, the core network node may also calculate the next hop deformation intermediate key $K_{RNC}^*$ based on IK, CK and the current deformation intermediate key $K_{RNC}^*$ first, and then progressively increase the network NCC.

Step S826: The core network node sends a relocation complete response message to the target RNC, wherein the message carries the following parameters: network NCC and the next hop deformation intermediate key $K_{RNC}^*$ corresponding to the network NCC.

Step S828: The target RNC saves the received network NCC and the next hop deformation intermediate key $K_{RNC}^*$.

Step S830: The source RNC releases the Iur interface with the core network node.

This step and step S828 may be performed without any specific sequence.

If the target RNC and/or the UE does not support the enhanced security, step S824 and step S828 are omitted, and the flow ends at step S830. If both the target RNC and the UE support the enhanced security, and the source RNC does not support the enhanced security, the core network node makes a decision to initiate the AKA and security mode establishment processes or only security mode establishment process, to generate an enhanced key. If both the target RNC and the UE support the enhanced security, and the source RNC also supports the enhanced security, the flow continues to step S832.

Step S832: The target RNC makes a decision to initiate the intra-RNC relocation.

Step S834: The target RNC derives and calculates the enhanced integrity key $IK_U$ and/or enhanced ciphering key $CK_U$ according to the deformation intermediate key $K_{RNC}^*$.

Optionally, the target RNC makes the intermediate key $K_{RNC}$ equal to the deformation intermediate key $K_{RNC}^*$, and calculates the updated $IK_U$ and/or $CK_U$ based on the intermediate key $K_{RNC}$.

Step S836: The target RNC sends a cell update acknowledge message or URA update acknowledge message or RAN mobility information message to the UE, wherein the message carries a parameter: network NCC.

Step S838: The UE updates the integrity key $IK_U$ and/or ciphering key $CK_U$ based on the deformation intermediate key $K_{RNC}^*$.

Optionally, the UE makes the intermediate key $K_{RNC}$ equal to the deformation intermediate key $K_{RNC}^*$, and calculates the updated $IK_U$ and/or $CK_U$ based on the intermediate key $K_{RNC}$.

In this step, the UE maintains a terminal NCC. When receiving the network NCC, the UE judges whether the terminal NCC corresponding to the current activated enhanced key is equal to the network NCC. If the terminal NCC is equal to the network NCC, the UE updates the enhanced integrity key $IK_U$ and/or enhanced ciphering key $CK_U$ according to the deformation intermediate key $K_{RNC}^*$ which is saved in the UE and is corresponding to the terminal NCC. If the terminal NCC is not equal to the network NCC, the UE calculates the deformation intermediate key $K_{RNC}^*$ and progressively increases the corresponding terminal NCC till the terminal NCC is equal to the network NCC, and updates the enhanced integrity key $IK_U$ and/or ciphering key $CK_U$ according to the deformation intermediate key $K_{RNC}^*$. The UE keeps the keys consistent to the keys of the target RNC by using the network NCC and the terminal NCC.

Step S840: The UE sends a UTRAN mobility information acknowledge message or RAN mobility information acknowledge message to the target RNC+.

Step S842: The target RNC sends an enhanced relocation complete request message to the core network node.

Step S844: The core network node progressively increases the network NCC after knowing that the SRNC relocation is completed successfully; and the core network node calculates the next hop deformation intermediate key $K_{RNC}^*$ corresponding to the progressively increased network NCC based on IK, CK and the current deformation intermediate key $K_{RNC}^*$.

Step S846: The core network node sends a relocation complete response message to the target RNC, wherein the message carries the following parameters: network NCC and the next hop deformation intermediate key $K_{RNC}^*$ corresponding to the network NCC.

Step S848: The target RNC saves the received network NCC and the next hop deformation intermediate key $K_{RNC}^*$.

In the above, step S842-step S848 are optional steps.

Figure 3:
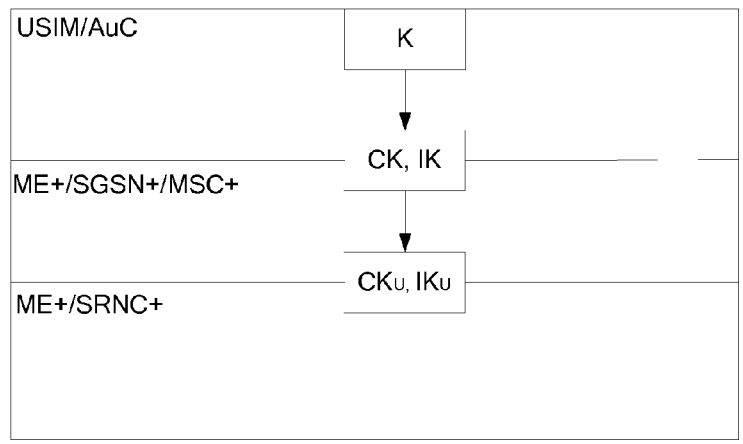
FIG. 3 shows the structure diagram of another HSPA+ security key hierarchy according to the related technologies.
Figure 4:
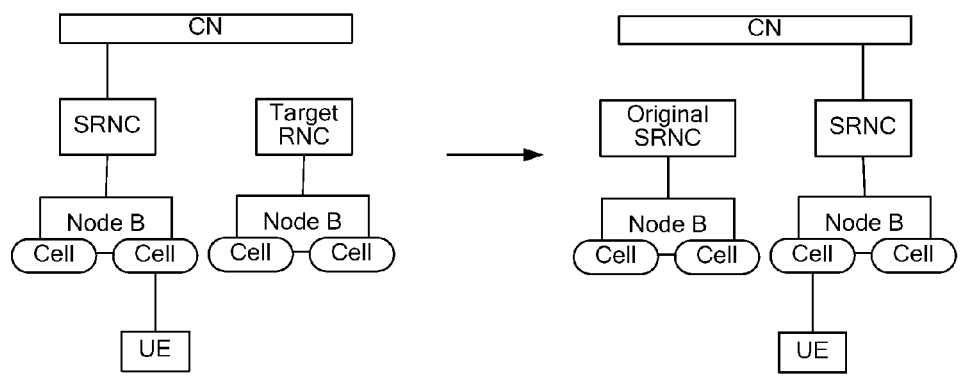
FIG. 4 shows a diagram of SRNC static relocation according to the related technologies.
Figure 5:
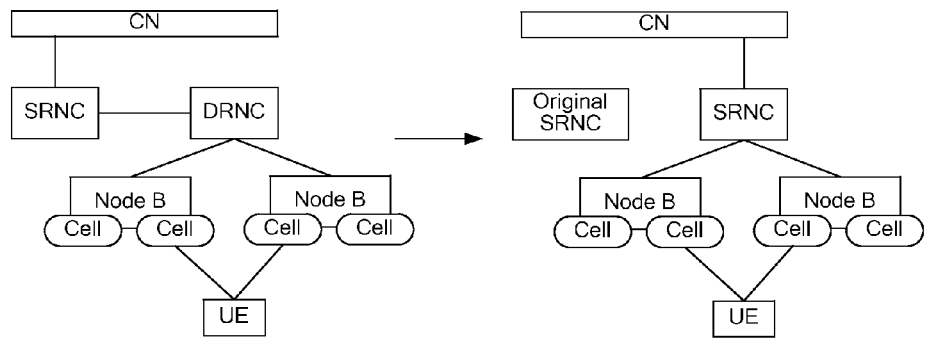
FIG. 5 shows the diagram of SRNC concomitant relocation according to the related technologies.
Figure 9:
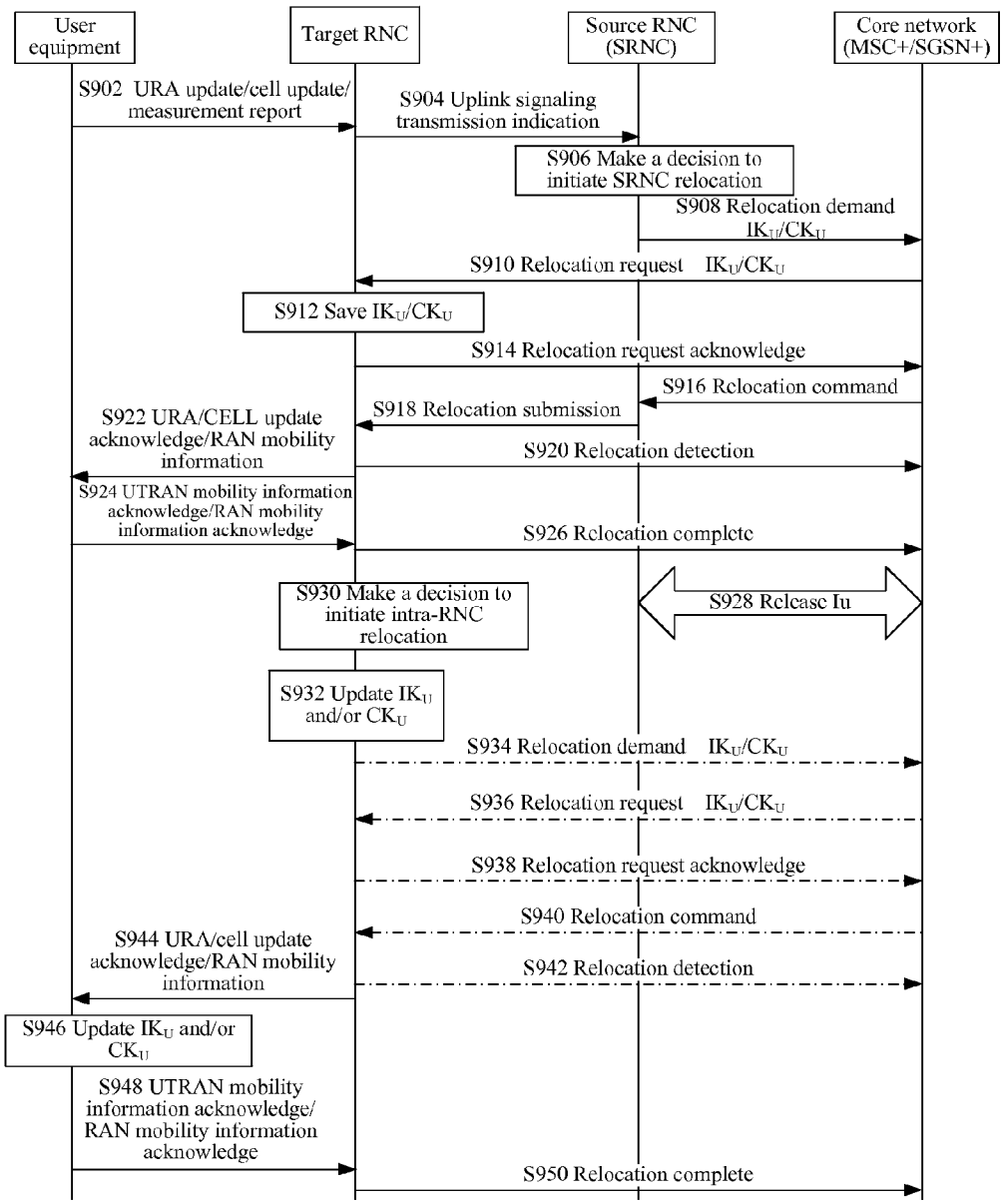
FIG. 9 shows the flowchart of updating an air interface key in a radio communication system according to embodiment 4 of the disclosure.

With reference to FIG. 9, the flowchart of updating an air interface key in another radio communication system according to an embodiment of the disclosure is shown. The difference between this embodiment and the embodiment shown in FIG. 7 is that: this embodiment is based on the enhanced key architecture shown in FIG. 3, and the method for updating a key is different. In this embodiment, the source RNC updates the air interface key $IK_U$ and/or $CK_U$ and then sends them/it to the target RNC, and the target RNC directly uses the updated key after receiving it.

The embodiment comprises the following steps.

Step S902-step S928 are the same as corresponding step S702-step S728 in the embodiment shown in FIG. 7.

If the target RNC and/or the UE does not support the enhanced security, the flow ends here. If both the target RNC and the UE support the enhanced security, and the source RNC does not support the enhanced security, the core network node makes a decision to initiate the AKA and the security mode establishment process, or only the security mode establishment process, to generate an enhanced key. If both the target RNC and the UE support the enhanced security, and the source RNC also supports the enhanced security, the flow continues to step S930.

Step S930: If both the UE and the target RNC support the enhanced security, the target RNC makes a decision to initiate the intra-RNC relocation.

Step S932: The target RNC updates the enhanced air interface key $IK_U/CK_U$.

The target RNC updates $IK_U/CK_U$ according to the $IK_U/CK_U$ saved in the target RNC and/or other parameters.

An exemplary derivation formula of $IK_U/CK_U$ in the above flow is as follows:

$$IK_U=F(IK_{U\_}old, Parameter), CK_U=F(CK_{U\_}old, Parameter);$$

or $(IK_U, CK_U)=F(IK_U\|CK_U, Parameter)$, where, F is any key generation function; for example, it may be a KDF function defined in the 3GPP; Parameter is one or more parameters; for example, it may be a FRESH parameter generated by the SRNC and/or target RNC identifier; $IK_{U\_}$old and $CK_{U\_}$old are the current enhanced keys at the SRNC; the SRNC calculates the updated $IK_U$ and $CK_U$ used by the target RNC according to $IK_{U\_}$old and $CK_{U\_}$old; and symbol $\|$ is concatenation.

In the above, the random number FRESH is a parameter already defined in the UMTS. The length of the random number is 32 bits. When a connection is established, the RNC generates a random number FRESH for each user, and sends it to the user through a security mode command message. During the whole duration of the connection, the network and the user use the random number to calculate a message authentication code (MAC-I) which is used for protecting the network from replay attack of the user signaling message.

Optionally, the target RNC takes the received IK during the last SRNC relocation process as IKU_old, and the received CK as CKU_old.

Step S934: The target RNC sends a relocation demand message to the core network node, wherein the message carries the updated enhanced air interface keys $IK_U$ and $CK_U$.

Step S936: The core network node sends a relocation request message to the target RNC, wherein the message carries the updated enhanced air interface keys $IK_U$ and $CK_U$.

Optionally, the target RNC puts the updated enhanced air interface keys $IK_U$ and $CK_U$ in the IK/CK field of a transparent container from the source RNC to the target RNC.

Step S938: The target RNC sends a relocation request acknowledge message to the core network node.

Step S940: The core network node sends a relocation command message to the target RNC.

Step S942: The target RNC sends a relocation detection message to the core network node.

In the above, step S934-step S942 are optional steps.

Step S944: The target RNC sends a cell update acknowledge message or URA update acknowledge message or RAN mobility information message to the UE.

Step S946: The UE updates the integrity key $IK_U$ and/or ciphering key $CK_U$ according to the same algorithm as the SRNC.

Optionally, the UE uses the IK used during the last SRNC relocation process as $IK_U$ old and the received CK as $CK_U$ old.

Step S948: The UE sends a UTRAN mobility information acknowledge message or RAN mobility information acknowledge message to the target RNC.

Step S950: The target RNC sends a relocation complete message to the core network node.

With reference to FIG. 9 again, the flowchart of updating an air interface key in another radio communication system according to an embodiment of the disclosure is shown. The difference between this embodiment and the embodiment shown in FIG. 7 is that: this embodiment is based on the enhanced key architecture shown in FIG. 3, and the method for updating a key is different. In this embodiment, the source RNC updates the air interface key $IK_U$ and/or $CK_U$ and then sends them/it to the target RNC, and the target RNC directly uses the updated key after receiving it. In addition, a universal SRNS relocation flow is employed in this embodiment. That is, in the preparation stage of relocation, messages between the source RNC and the target RNC need to be transferred through core network nodes.

The embodiment comprises the following steps.

Step S1002-step S1006 are the same as corresponding step S702-step S706 in the embodiment shown in FIG. 7.

Step S1008: The source RNC determines what is triggered is a static SRNC relocation, and the source RNC performs the same SRNC relocation flow as the traditional UMTS. That is, the source RNC sends a relocation demand message to the core network node (SGSN+ or MSC+), and the relocation demand message carries parameters of: enhanced keys $IK_U$ and $CK_U$.

Step S1010: The core network node sends a relocation request message to the target RNC, wherein the relocation request message carries the parameter: an enhanced key $IK_U$ and/or $CK_U$.

In Step S1008-step S1010, if the source RNC does not support the enhanced security, the key sent to the target RNC by the source RNC is: a traditional air interface key IK and/or CK.

If the source RNC supports the enhanced security, the source RNC directly sends the enhanced air interface key $IK_U$ and/or $CK_U$ to the target RNC. Optionally, the source RNC puts the enhanced air interface key $IK_U$ and/or $CK_U$ in the IK and/or CK field of a transparent container from the source RNC to the target RNC for sending.

Preferably, the relocation demand message and the relocation request message carry: an indication through which the source RNC indicates the target RNC to perform security operations defined in the traditional UMTS, in order to indicate the target RNC not to update the enhanced keys. For example, in the embodiment, the NCC fields in the relocation demand message and the relocation request message may be set to be null or a certain special value.

If the source RNC and the target RNC are under different core network nodes, the relocation demand message and the relocation request message need to be transferred through a plurality of core network nodes.

Through the relocation demand message and the relocation request message, the effective transfer of keys and other parameters required by relocation is realized.

Step S1012: The target RNC saves the key received from the source RNC.

If the key received by the target RNC is in the IK and/or CK field of the relocation request message sent by the core network node, the target RNC may take it as the enhanced key $IK_U$ and/or $CK_U$ (the target RNC supports the enhanced security mode), or take it as the traditional key IK and/CK (the target RNC does not support the enhanced security mode).

Step S1014: The target RNC sends a relocation request acknowledge message to the core network node.

If the source RNC and the target RNC are under different core network nodes, the message needs to be transferred through a plurality of core network nodes.

Step S1016: The core network node sends a relocation command message to the source RNC.

Step S1018: The source RNC sends a relocation required message to the target RNC.

Step S1020: The target RNC sends a relocation detection message to the core network node.

Step S1022: The target RNC sends a cell update acknowledge message or URA update acknowledge message or RAN mobility information message to the UE, wherein the message carries the indication information of the security capability of the target RNC.

Step S1024: The UE sends a UTRAN mobility information acknowledge message or RAN mobility information acknowledge message to the target RNC, wherein the message carries the indication information of the security capability of the UE.

Through step S1022-step S1024, the target RNC and the UE respectively know each other's security capability.

Step S1026: The target RNC sends a relocation complete message to the core network node.

Step S1028: The source RNC releases the Iur interface with the core network node. If the target RNC and/or the UE does not support the enhanced security, the flow ends here. If both the target RNC and the UE support the enhanced security, and the source RNC does not support the enhanced security, the core network node makes a decision to initiate the AKA and security mode establishment process, or only the security mode establishment process, to generate an enhanced key. If both the target RNC and the UE support the enhanced security, and the source RNC also supports the enhanced security, the flow continues to step S1030.

Step S1030: If both the UE and the target RNC support the enhanced security, the target RNC makes a decision to initiate the intra-RNC relocation.

Step S1032: The target RNC updates the enhanced air interface key $IK_U/CK_U$.

The target RNC updates $IK_U/CK_U$ according to the $IK_U/CK_U$ saved in the target RNC and/or other parameters.

An exemplary derivation formula of $IK_U/CK_U$ in the above flow is as follows:

$$IK_U = F(IK_{U\_old}, Parameter), CK_U = F(CK_{U\_old}, Parameter);$$

$$\text{or } (IK_U, CK_U) = F(IK_U \| CK_U, Parameter),$$

where, F is any key generation function; for example, it may be a KDF function defined in the 3GPP; Parameter is one or more parameters; for example, it may be a FRESH parameter generated by the SRNC and/or target RNC identifier; $IK_{U\_old}$ and $CK_{U\_old}$ are current enhanced keys at the SRNC; the SRNC calculates the updated $IK_U$ and $CK_U$ used by the target RNC according to $IK_{U\_old}$ and $CK_{U\_old}$; symbol $\|$ is concatenation.

In the above, the random number FRESH is a parameter already defined in the UMTS. The length of the random number is 32 bits. When a connection is established, the RNC generates a random number FRESH for each user, and sends it to the user through a security mode command message. During the whole duration of the connection, the network and the user use the random number to calculate a message authentication code (MAC-I) which is used for protecting the network from replay attack of the user signaling message.

Optionally, the target RNC takes the received IK during the last SRNC relocation process as $IK_{U\_old}$, and the received CK as $CK_{U\_old}$.

Step S1034: The target RNC sends a relocation demand message to the core network node, wherein the message carries the updated enhanced air interface keys $IK_U$ and $CK_U$.

Step S1036: The core network node sends a relocation request message to the target RNC, wherein the message carries the updated enhanced air interface keys $IK_U$ and $CK_U$.

Optionally, the target RNC puts the updated enhanced air interface keys $IK_U$ and $CK_U$ in the IK/CK field of a transparent container from the source RNC to the target RNC.

Step S1038: The target RNC sends a relocation request acknowledge message to the core network node.

Step S1040: The core network node sends a relocation command message to the target RNC.

Step S1042: The target RNC sends a relocation detection message to the core network node.

In the above, step S1034-step S1042 are optional steps.

Step S1044: The target RNC sends a cell update acknowledge message or URA update acknowledge message or RAN mobility information message to the UE.

Step S1046: The UE updates the integrity key $IK_U$ and/or ciphering key $CK_U$ according to the same algorithm as the SRNC.

Optionally, the UE takes the IK used during the last SRNC relocation process as $IK_{U\_}$old, and the received CK as $CK_{U\_}$old.

Step S1048: The UE sends a UTRAN mobility information acknowledge message or RAN mobility information acknowledge message to the target RNC.

Step S1050: The target RNC sends a relocation complete message to the core network node. The message is optional.

Figure 10:
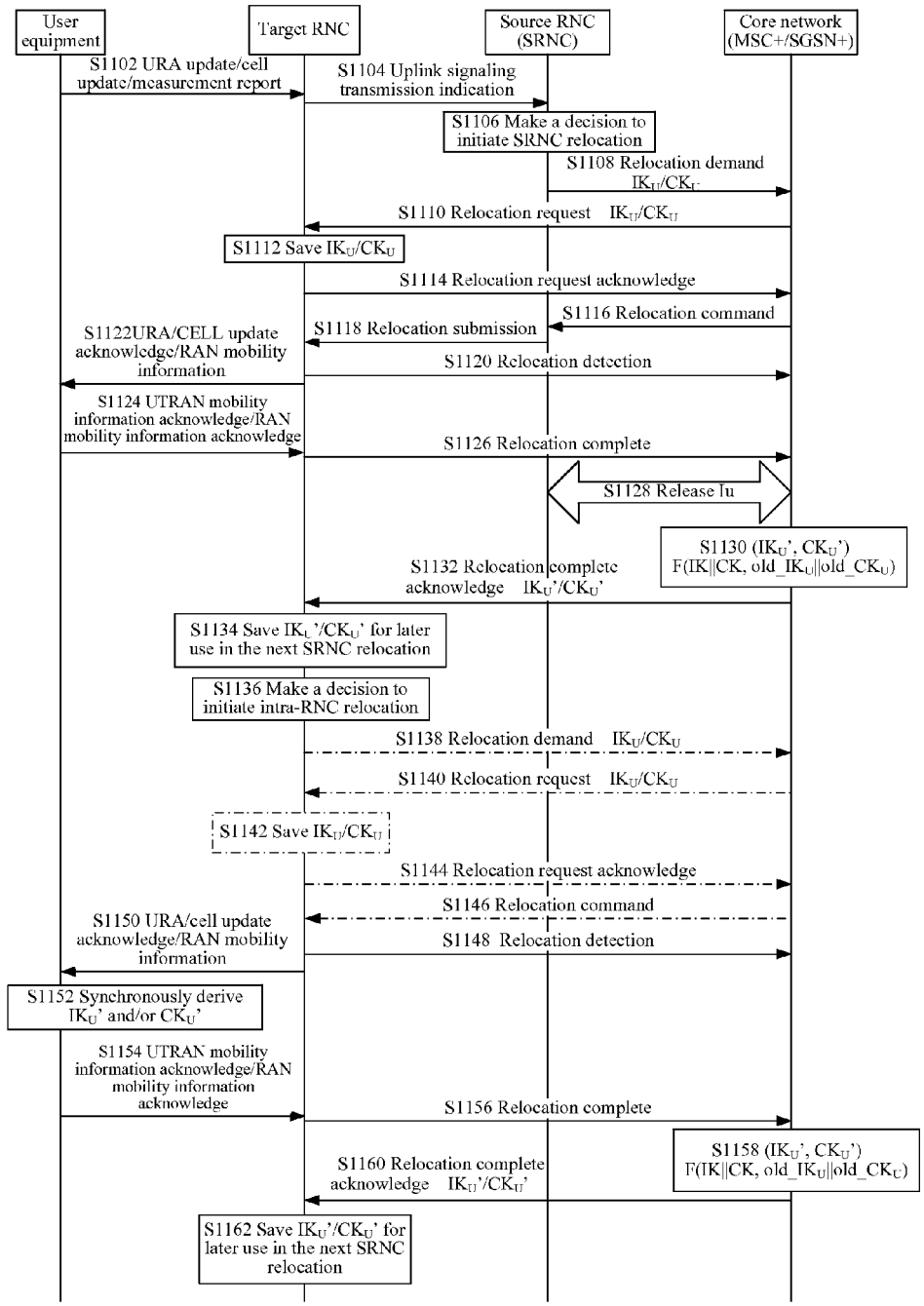
FIG. 10 shows the flowchart of updating an air interface key in a radio communication system according to embodiment 5 of the disclosure.

With reference to FIG. 10, the flowchart of updating an air interface key in still another radio communication system according to an embodiment of the disclosure is shown. This embodiment and the embodiment shown in FIG. 8 employ the same enhanced key architecture as that shown in FIG. 3, and the difference is that the method for updating a key is different. In this embodiment, after each time of successful SRNC relocation process, the core network node derives the next hop enhanced keys $IK_U'$ and $CK_U'$ according to the traditional keys IK and CK saved in the core network node and the enhanced keys $IK_U$ and $CK_U$, and sends the next hop enhanced keys $IK_U'$ and $CK_U'$ to the target RNC to be saved for later use in the next SRNC relocation. In the next SRNC relocation, the source RNC (that is, the target RNC during the last SRNC relocation process) sends the saved enhanced keys $IK_U'$ and $CK_U'$ to the target RNC, and the target RNC directly uses the received keys.

The embodiment comprises the following steps.

Step S1102-step S1128 are the same as corresponding step S702-step S728 in the embodiment shown in FIG. 7.

If the target RNC and/or the UE does not support the enhanced security, the flow ends here. If both the target RNC and the UE support the enhanced security, and the source RNC does not support the enhanced security, the core network node makes a decision to initiate the AKA and security mode establishment process, or only the security mode establishment process, to generate an enhanced key. If both the target RNC and the UE support the enhanced security, and the source RNC also supports the enhanced security, the flow continues to step S1130.

Step S1130: After knowing that the SRNC relocation is successfully completed, the core network node calculates the next hop enhanced keys $IK_U'$ and $CK_U'$ according to IK and CK saved in the core network node and the current enhanced keys $IK_U$ and $CK_U$.

Preferably, the core network node maintains a network NCC to count the number of times of calculating the next hop enhanced keys $IK_U'$ and $CK_U'$. When knowing that the SRNC relocation is successfully completed, the core network node progressively increases the network NCC, and calculates the next hop enhanced keys $IK_U'$ and $CK_U'$ corresponding to the progressively increased network NCC.

Or, the core network node may also calculate the next hop enhanced keys $IK_U'$ and $CK_U'$ based on IK, CK and the current enhanced keys $IK_U$ and $CK_U$ first, and then progressively increase the network NCC.

Step S1132: The core network node sends a relocation complete response message to the target RNC, wherein the message carries the following parameters: the next hop enhanced keys $IK_U'$ and $CK_U'$, and/or the corresponding network NCC.

Step S1134: The target RNC saves the received next hop enhanced keys $IK_U'$ and $CK_U'$, and/or the corresponding network NCC, for later use in the next SRNC relocation.

Step S1136: The target RNC makes a decision to initiate the intra-RNC relocation.

Step S1138: The target RNC sends a relocation demand message to the core network node, wherein the message carries parameters: the next hop enhanced keys $IK_U'$ and $CK_U'$, and/or the corresponding network NCC.

Optionally, the target RNC puts the enhanced air interface keys $IK_U/CK_U$ in the IK/CK field of a transparent container from the source RNC to the target RNC for sending.

Step S1140: The core network node sends a relocation request message to the target RNC, wherein the message carries parameters: the next hop enhanced keys $IK_U'$ and $CK_U'$, and/or the corresponding network NCC.

Step S1142: The target RNC saves the received enhanced integrity key $IK_U$ and/or enhanced ciphering key $CK_U$.

Step S1144: The target RNC sends a relocation request acknowledge message to the core network node.

Step S1146: The core network node sends a relocation command message to the target RNC.

Step S1148: The target RNC sends a relocation detection message to the core network node.

In the above, step S1138-step S1148 are optional steps.

Step S1150: The target RNC sends a cell update acknowledge message or URA update acknowledge message or RAN mobility information message to the UE, wherein the message carries a parameter: network NCC.

Step S1152: The UE updates the integrity key $IK_U$ and/or ciphering key $CK_U$ according to the same algorithm as the network side.

In the embodiment, the UE maintains a terminal NCC. When receiving the network NCC, the UE judges whether the terminal NCC corresponding to the current activated enhanced key is equal to the network NCC. If the terminal NCC is equal to the network NCC, the UE directly uses the enhanced integrity key $IK_U$ and/or enhanced ciphering key $CK_U$ saved in the UE. If the terminal NCC is not equal to the network NCC, the UE calculates the enhanced key $IK_U/CK_U$ and progressively increases the corresponding terminal NCC till the terminal NCC is equal to the network NCC. The UE keeps the keys consistent to the keys of the target RNC by using the network NCC and the terminal NCC.

Step S1154: The UE sends a UTRAN mobility information acknowledge message or RAN mobility information acknowledge message to the target RNC.

Step S1156: The target RNC sends a relocation complete message to the core network node.

Step S1158: After knowing that the SRNC relocation is completed successfully, the core network node calculates the next hop enhanced keys $IK_U'$ and $CK_U'$ according to IK and CK saved in the core network node and the current enhanced keys $IK_U$ and $CK_U$.

Preferably, the core network node maintains a network NCC to count the number of times of calculating the next hop enhanced keys $IK_U'$ and $CK_U'$. When knowing that the SRNC relocation is successfully completed, the core network node progressively increases the network NCC, and calculates the next hop enhanced keys $IK_U'$ and $CK_U'$ corresponding to the progressively increased network NCC.

Or, the core network node may also calculate the next hop enhanced keys $IK_U'$ and $CK_U'$ based on IK, CK and the current deformation intermediate key $K_{RNC}*$ first, and then progressively increase the network NCC.

Step S1160: The core network node sends a relocation complete response message to the target RNC, wherein the message carries the following parameters: the next hop enhanced keys $IK_U'$ and $CK_U'$ and/or the corresponding network NCC.

Step S1162: The target RNC saves the received next hop enhanced keys $IK_U'$ and $CK_U'$ and/or the corresponding network NCC for later use in the next SRNC relocation.

Figure 11:
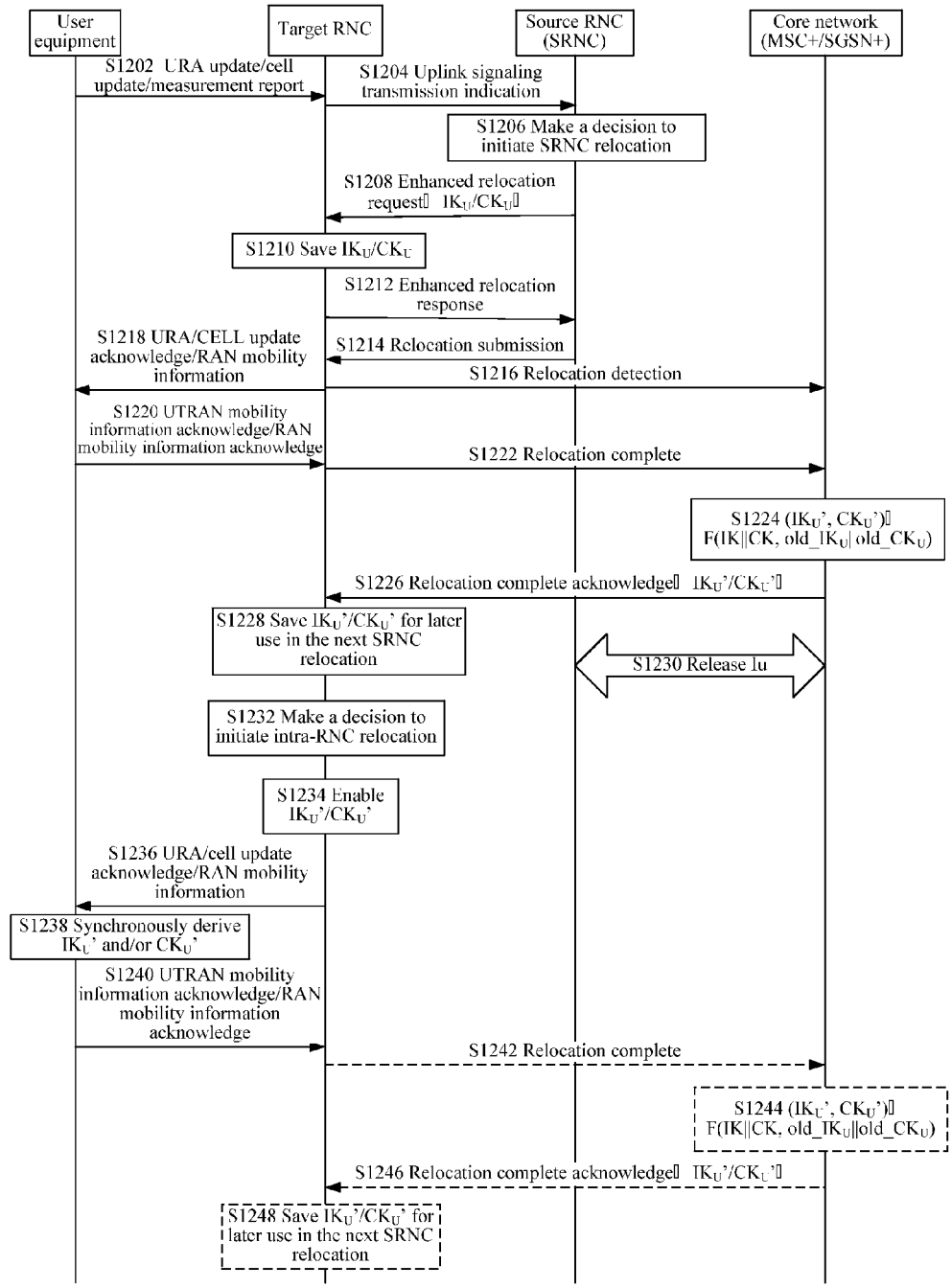
FIG. 11 shows the flowchart of updating an air interface key in a radio communication system according to embodiment 6 of the disclosure.

In the SRNC relocation process in embodiments shown in FIG. 7, FIG. 9 and FIG. 11, it can be that the message interaction between the target RNC and the source RNC is not transferred through core network nodes (SGSN+ or MSC+). That is, the enhanced SRNC relocation flow is employed for message interaction. In this case, the relocation request message sent by the source RNC to the target RNC is called the enhanced relocation request message. The relocation demand message and the relocation request message in FIG. 7, FIG. 9 and FIG. 11 are replaced with the enhanced relocation request message sent to the target RNC by the source RNC, and the relocation request acknowledge message and the relocation command message are replaced with the enhanced relocation response message sent to the source RNC by the target RNC. The relocation complete message and the relocation complete acknowledge message in FIG. 7, FIG. 9 and FIG. 11 are replaced with the enhanced relocation complete request message and the enhanced relocation complete response message between the target RNC and the core network node respectively.

In the above, the enhanced relocation request message carries the next hop enhanced air interface integrity key $IK'_U$ and the next hop enhanced air interface ciphering key $CK'_U$. The source RNC may put the next hop enhanced keys $IK'_U$ and $CK'_U$ in the IK and CK fields of the relocation demand message respectively and send to the target RNC. Other than these, operations of other steps are completely identical. As the key update principle is the same as that in the above embodiment, it will not be repeated herein.

With reference to FIG. 11, the flowchart of updating an air interface key in yet another radio communication system according to an embodiment of the disclosure is shown. This embodiment and the embodiment shown in FIG. 9 employ the same enhanced key architecture as that shown in FIG. 3, and the difference is that the method for updating a key is different. In this embodiment, after each time of successful SRNC relocation process, the core network node derives the next hop enhanced keys $IK_U'$ and $CK_U'$ according to the traditional keys IK and CK saved in the core network node, and the enhanced keys $IK_U$ and $CK_U$, and sends them to the target RNC to be saved for later use in the next SRNC relocation. In the next SRNC relocation, the source RNC+ (that is, the target RNC+ during the last SRNC relocation process) sends the saved enhanced keys $IK_U'$ and $CK_U'$ to the target RNC, and the target RNC directly uses the received keys.

The embodiment comprises the following steps.

Step S1202-step S1222 are the same as corresponding step S702-step S722 in the embodiment shown in FIG. 7.

Step S1224: After knowing that the SRNC relocation is successfully completed, the core network node calculates the next hop enhanced keys $IK_U'$ and $CK_U'$ according to IK and CK saved in the core network node and the current enhanced keys $IK_U$ and $CK_U$.

Preferably, the core network node maintains a network NCC to count the number of times of calculating the next hop enhanced keys $IK_U'$ and $CK_U'$. When knowing that the SRNC relocation is successfully completed, the core network node progressively increases the network NCC, and calculates the next hop enhanced keys $IK_U'$ and $CK_U'$ corresponding to the progressively increased network NCC.

Or, the core network node may also calculate the next hop enhanced keys $IK_U'$ and $CK_U'$ based on IK, CK and the current enhanced keys $IK_U$ and $CK_U$ first, and then progressively increase the network NCC.

Step S1226: The core network node sends a relocation complete response message to the target RNC+, wherein the message carries the following parameters: the next hop enhanced keys $IK_U'$ and $CK_U'$, and/or the corresponding network NCC.

Step S1228: The target RNC+ saves the received next hop enhanced keys $IK_U'$ and $CK_U'$, and/or the corresponding network NCC, for later use in the next SRNC relocation.

Step S1230: The source RNC+ releases the Iur interface with the core network node.

This step and step S1228 may be performed without any specific sequence.

If the target RNC and/or the UE does not support the enhanced security, step S1224 and step S1228 are omitted, and the flow ends at step S1230. If both the target RNC and the UE support the enhanced security, and the source RNC does not support the enhanced security, the core network node makes a decision to initiate the AKA and security mode establishment process, or only the security mode establishment process, to generate an enhanced key. If both the target RNC and the UE support the enhanced security, and the source RNC also supports the enhanced security, the flow continues to step S1232.

Step S1232: The target RNC+ makes a decision to initiate the intra-RNC relocation.

Step S1234: The target RNC enables the saved enhanced integrity key $IK_U'$ and/or enhance ciphering key $CK_U'$ in step S1228. That is, the target RNC+ takes $IK_U'$ as $IK_U$ and $CK_U'$ as $CK_U$.

Step S1236: The target RNC+ sends a cell update acknowledge message or URA update acknowledge message or RAN mobility information message to the UE, wherein the message carries a parameter: network NCC.

Step S1238: The UE updates the integrity key $IK_U$ and/or ciphering key $CK_U$ according to the same algorithm as the network side.

In the embodiment, the UE maintains a terminal NCC. When receiving the network NCC, the UE judges whether the terminal NCC corresponding to the current activated enhanced key is equal to the network NCC. If the terminal NCC is equal to the network NCC, the UE directly uses the enhanced integrity key $IK_U$ and/or enhanced ciphering key $CK_U$ saved in the UE. If the terminal NCC is not equal to the network NCC, the UE calculates the enhanced key $IK_U/CK_U$ and progressively increases the corresponding terminal NCC till the terminal NCC is equal to the network NCC. The UE keeps the keys consistent to the keys of the target RNC by using the network NCC and the terminal NCC.

Step S1240: The UE sends a UTRAN mobility information acknowledge message or RAN mobility information acknowledge message to the target RNC+.

Step S1242: The target RNC+ sends a relocation complete message to the core network node.

Step S1244: After knowing that the SRNC relocation is completed successfully, the core network node calculates the next hop enhanced keys $IK_U'$ and $CK_U'$ according to IK and CK saved in the core network node and the current enhanced keys $IK_U$ and $CK_U$.

Preferably, the core network node maintains a network NCC to count the number of times of calculating the next hop enhanced keys $IK_U'$ and $CK_U'$. When knowing that the SRNC relocation is successfully completed, the core network node progressively increases the network NCC, and calculates the next hop enhanced keys $IK_U'$ and $CK_U'$ corresponding to the progressively increased network NCC.

Or, the core network node may also calculate the next hop enhanced keys $IK_U'$ and $CK_U'$ based on IK, CK and the current deformation intermediate keys $IK_U$ and $CK_U$ first, and then progressively increase the network NCC.

Step S1246: The core network node sends a relocation complete response message to the target RNC+, wherein the message carries the following parameters: the next hop enhanced keys $IK_U'$ and $CK_U'$ and/or the corresponding network NCC.

Step S1248: The target RNC+ saves the received next hop enhanced keys $IK_U'$ and $CK_U'$ and/or the corresponding network NCC for later use in the next SRNC relocation.

In the above, step S1242-step S1248 are optional steps.

Figure 12:
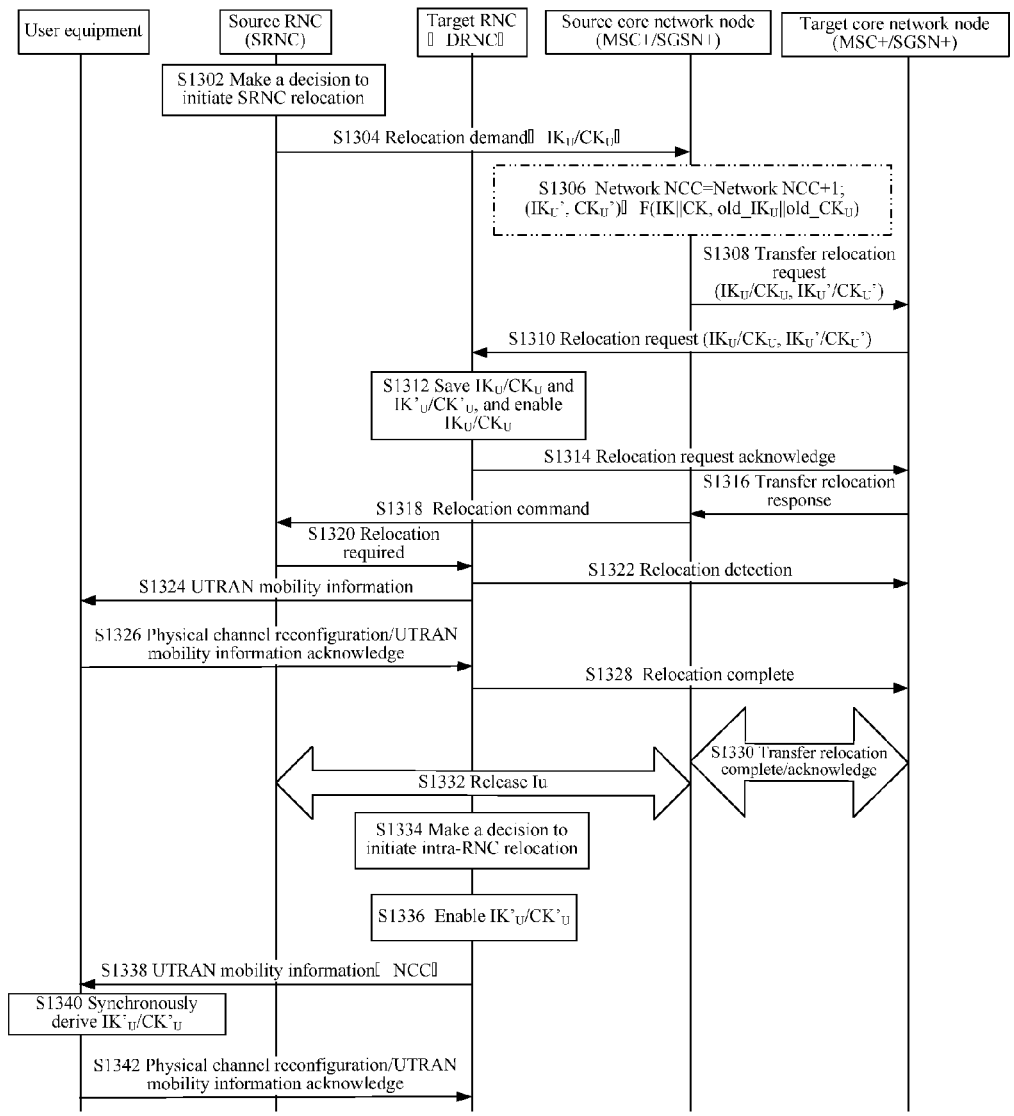
FIG. 12 shows the flowchart of updating an air interface key in a radio communication system according to embodiment 7 of the disclosure.

With reference to FIG. 12, a diagram of employing a universal SRNC static relocation flow for SRNC relocation key update is shown. The difference between this embodiment and the embodiment shown in FIG. 9 is that the way for updating a key is different. The following specific steps are comprised.

Step S1302: The source RNC makes a decision to perform the SRNC relocation flow.

Step S1304: The source RNC sends a relocation demand message to the core network node, wherein the message carries the enhanced keys $IK_U$ and $CK_U$ currently used by the source RNC.

Preferably, the source RNC puts the enhanced keys $IK_U$ and $CK_U$ in the IK and CK fields of a transparent container from the source RNC to the target RNC.

Step S1306: The source core network node calculates the next hop enhanced keys $IK_U'$ and $CK_U'$ according to IK and CK (or $K_{ASMEU}$) saved in the source core network node and the current enhanced keys $IK_U$ and $CK_U$.

Preferably, the core network node maintains a network NCC to count the number of times of calculating the next hop enhanced keys $IK_U'$ and $CK_U'$. When knowing that the SRNC relocation is successfully completed, the core network node progressively increases the network NCC, and calculates the next hop enhanced keys $IK_U'$ and $CK_U'$ corresponding to the progressively increased network NCC.

Or, the core network node may also calculate the next hop enhanced keys $IK_U'$ and $CK_U'$ based on IK, CK and the current enhanced keys $IK_U$ and $CK_U$ first, and then progressively increase the network NCC.

Step S1308: The source core network node sends a transfer relocation request message to the target core network node, wherein the message carries the following parameters: the current enhanced key $IK_U/CK_U$, the next hop enhanced key $IK_U'/CK_U'$, and/or the corresponding network NCC.

Step S1310: The target core network node sends a relocation request message to the target RNC, wherein the message carries the following parameters: the current enhanced key $IK_U/CK_U$, the next hop enhanced key $IK_U'/CK_U'$, and/or the corresponding network NCC.

Step S1312: The target RNC saves the received current enhanced key $IK_U/CK_U$, the next hop enhanced key $IK_U'/CK_U'$, and/or the corresponding network NCC.

Step S1314: The target RNC sends a relocation request acknowledge message to the target core network node.

Step S1316: The target core network node sends a transfer relocation response message to the source core network node.

Step S1318: The source core network node sends a relocation command message to the source RNC.

Step S1320: The source RNC sends a relocation required message to the target RNC.

Step S1322: The target RNC sends a relocation detection message to the target core network node.

Step S1324: The target RNC sends a UTRAN mobility information message or cell update acknowledge message and URA update acknowledge message to the UE.

Step S1326: The UE uses the currently activated enhanced key $IK_U/CK_U$ to decipher and authenticate the received message, and sends a UTRAN mobility information acknowledge message to the target RNC, wherein the message is still protected by the enhanced key $IK_U/CK_U$ which is used for communication between the UE and the source RNC.

Step S1328: The target RNC sends a relocation complete message to the target core network node to notify the core network node that the relocation is completed successfully.

Step S1330: The target core network node and the source core network node perform the interaction of the transfer relocation complete/acknowledge message.

Step S1332: The source core network node releases the Iu interface with the source RNC.

Step S1334: The target RNC makes a decision to initiate the intra-RNC relocation.

Step S1336: The target RNC enables the saved next hop enhanced key $IK_U'/CK_U'$, and takes $IK_U'$ as $IK_U$ and $CK_U'$ as $CK_U$.

Step S1338: The target RNC sends a UTRAN mobility information message or URA update acknowledge message or RAN mobility information message to the UE, wherein the message carries a parameter: network NCC.

Step S1340: The UE synchronizes the enhanced key $IK_U/CK_U$ according to the same algorithm as the network side.

In the embodiment, the UE maintains a terminal NCC. When receiving the network NCC, the UE judges whether the terminal NCC corresponding to the current activated enhanced key is equal to the network NCC. If the terminal NCC is equal to the network NCC, the UE directly uses the enhanced integrity key $IK_U$ and/or enhanced ciphering key $CK_U$ saved in the UE. If the terminal NCC is not equal to the network NCC, the UE calculates the enhanced key $IK_U/CK_U$ and progressively increases the corresponding terminal NCC till the terminal NCC is equal to the network NCC. The UE keeps the keys consistent to the keys of the target RNC by using the network NCC and the terminal NCC.

Step S1342: The UE sends a UTRAN mobility information acknowledge message to the target RNC. The message is protected by the updated enhanced key $IK_U/CK_U$. After receiving the message, the target RNC uses the updated key to authenticate the message. If the authentication is successful, the intra-SRNS relocation flow is completed successfully.

Figure 13:
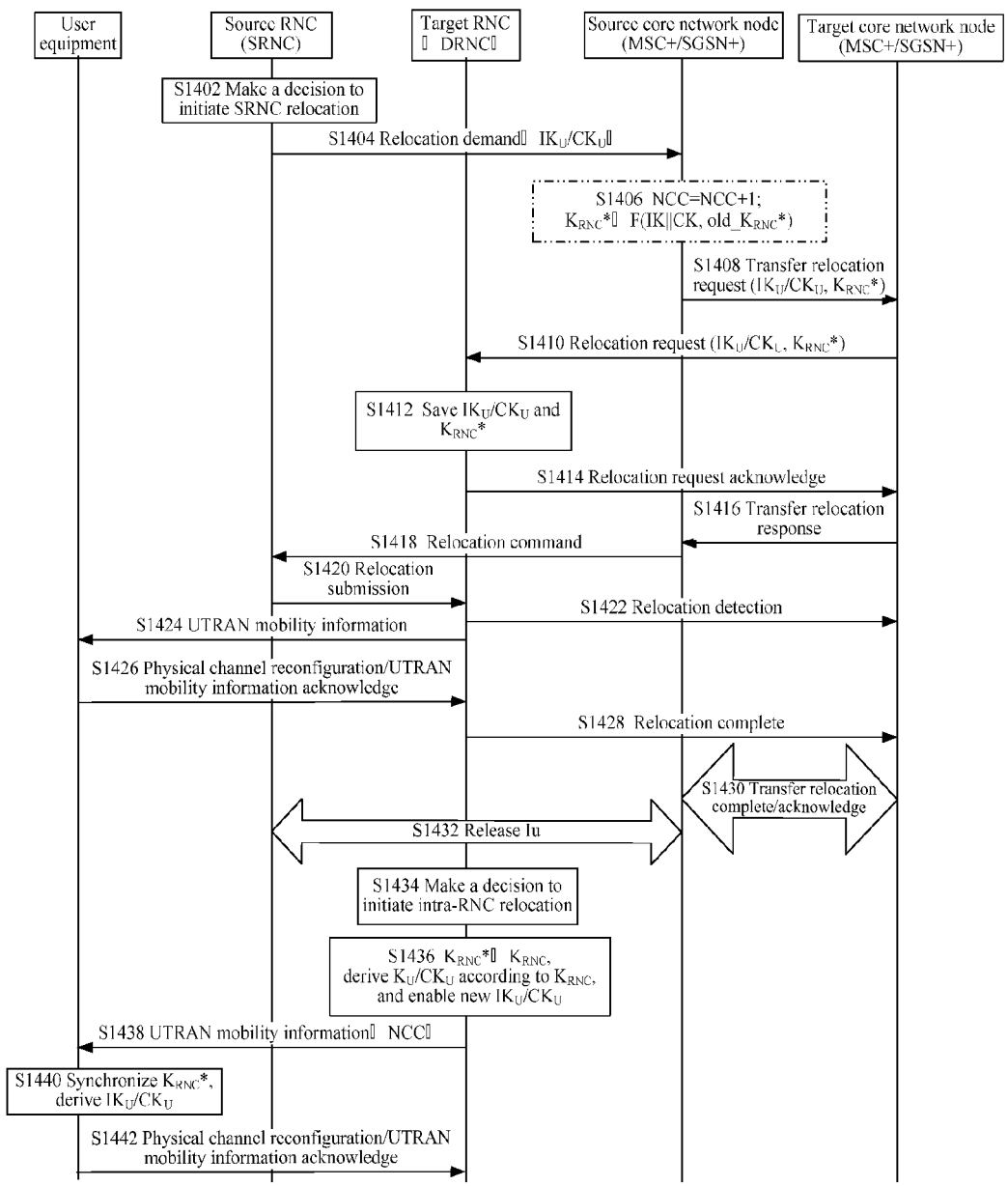
FIG. 13 shows the flowchart of updating an air interface key in a radio communication system according to embodiment 8 of the disclosure.

With reference to FIG. 13, a diagram of employing a universal SRNC static relocation flow for SRNC relocation key update is shown. The difference between this embodiment and the embodiment shown in FIG. 7 is that the way for updating a key is different. The following specific steps are comprised.

Step S1402-step S1404 are the same as corresponding step S1302-step S1304 in FIG. 12.

Step S1406: The core network node calculates the next hop deformation intermediate key $K_{RNC}*$ based on the saved traditional keys IK and CK and the current deformation intermediate key $K_{RNC}*$.

As a preferred solution, in the embodiment, the core network node maintains a network NCC to count the number of times of calculating the deformation intermediate key $K_{RNC}*$.

When knowing that the SRNC relocation is successfully completed, the core network node progressively increases the network NCC, and calculates the next hop deformation intermediate key $K_{RNC}*$ corresponding to the progressively increased network NCC. Or, the core network node may also calculate the next hop deformation intermediate key $K_{RNC}*$ based on IK, CK and the current deformation intermediate key $K_{RNC}*$ first, and then progressively increase the network NCC.

Step S1408: The source core network node sends a transfer relocation request message to the target core network node, wherein the message carries the following parameters: the current enhanced key $IK_U/CK_U$, the next hop deformation intermediate key $K_{RNC}*$, and/or the corresponding network NCC.

Step S1410: The target core network node sends a relocation request message to the target RNC, wherein the message carries the following parameters: the current enhanced key $IK_U/CK_U$, the next hop deformation intermediate key $K_{RNC}*$, and/or the corresponding network NCC.

Step S1412: The target RNC saves the received current enhanced key $IK_U/CK_U$, the next hop deformation intermediate key $K_{RNC}*$, and/or the corresponding network NCC.

Step S1414-step S1434 are the same as corresponding step S1314-step S1334 in FIG. 12.

Step S1436: The target RNC derives and calculates the enhanced integrity key $IK_U$ and/or enhanced ciphering key $CK_U$ according to the saved deformation intermediate key $K_{RNC}*$.

Optionally, the target RNC makes the intermediate key $K_{RNC}$ equal to the deformation intermediate key $K_{RNC}*$, and calculates the updated $IK_U$ and/or $CK_U$ based on the intermediate key $K_{RNC}$.

Step S1438 is the same as step S1338 in FIG. 12.

Step S1440: The UE updates the integrity key $IK_U$ and/or ciphering key $CK_U$ based on the deformation intermediate key $K_{RNC}*$.

Optionally, the UE makes the intermediate key $K_{RNC}$ equal to the deformation intermediate key $K_{RNC}*$, and calculates the updated $IK_U$ and/or $CK_U$ based on the intermediate key $K_{RNC}$.

In this step, the UE maintains a terminal NCC. When receiving the network NCC, the UE judges whether the terminal NCC corresponding to the current activated enhanced key is equal to the network NCC. If the terminal NCC is equal to the network NCC, the UE updates the enhanced integrity key $IK_U$ and/or enhanced ciphering key $CK_U$ according to the deformation intermediate key $K_{RNC}*$ which is saved in the UE and is corresponding to the terminal NCC. If the terminal NCC is not equal to the network NCC, the UE calculates the deformation intermediate key $K_{RNC}*$ and progressively increases the corresponding terminal NCC till the terminal NCC is equal to the network NCC, and updates the enhanced integrity key $IK_U$ and/or ciphering key $CK_U$ according to the deformation intermediate key $K_{RNC}*$. The UE keeps the keys consistent to the keys of the target RNC by using the network NCC and the terminal NCC.

Step S1442 is the same as step S1342 in FIG. 12.

Figure 14:
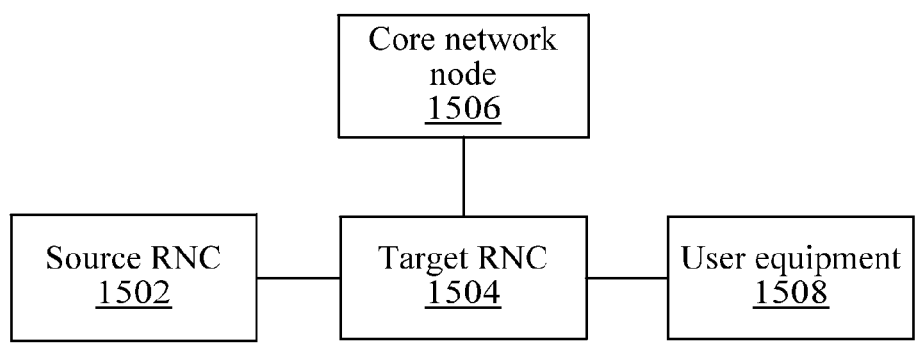
FIG. 14 shows a structure block diagram of a radio access system according to embodiment 9 of the disclosure.

With reference to FIG. 14, a structure block diagram of a radio access system according to an embodiment of the disclosure is shown, comprising: a source RNC 1502 and a target RNC 1504.

In the above, the source RNC 1502 is configured to perform the static relocation towards the target RNC.

In the above, the target RNC 1504 is configured to, after the source RNC 1502 completes the static relocation towards the target RNC 1504, perform intra-SRNC relocation, and during the intra-SRNC relocation, update the enhanced key of itself according to a key received from the source RNC 1502 or a core network node.

In the above, if the source RNC 1502 supports the enhanced security, the key sent by the source RNC 1502 is an enhanced key. However, the target RNC 1504 may take it as an enhanced key, and also may take it as a traditional key. When the source RNC 1502 does not support the enhanced security, the key sent by the source RNC 1502 can only be a traditional key.

Preferably, the radio access system in the embodiment may also comprise: a core network node 1506. The core network node 1506 is configured to use the saved traditional key and the current deformation intermediate key to generate the next hop deformation intermediate key and send to the target RNC 1504; or, is configured to use the saved traditional key and the current enhanced key to generate the next hop enhanced key and send to the target RNC 1504.

Preferably, the core network node 1506 comprises a network NCC, which is configured to count the number of times of generating the next hop deformation intermediate key or next hop enhanced key.

Preferably, the radio access system in the embodiment may further comprise: a UE 1508, wherein there is a terminal NCC arranged in the UE 1508. The UE 1508 comprises: a receiving module, configured to receive a relocation acknowledge message sent by the target RNC 1504, wherein the relocation acknowledge message comprises the network NCC of a core network node 1506; a judging module, configured to judge whether the terminal NCC is equal to the network NCC; a positive result module, configured to, if the result of the judgment of the judging module is YES, update the enhanced key of itself according to a deformation intermediate key which is saved in advance and is corresponding to the terminal NCC; or, use an enhanced key which is saved in advance and is corresponding to the terminal NCC; and, a negative result module, configured to, if the result of the judgment of the judging module is NO, calculate a deformation intermediate key and progressively increase the corresponding terminal NCC till the terminal NCC is equal to the network NCC, and calculate and update the enhanced key of itself according to the deformation intermediate key; or, calculate the enhanced key and progressively increase the corresponding terminal NCC till the terminal NCC is equal to the network NCC.

It should be noted that the solutions provided in the disclosure are not limited to UMTS. For those skilled in the art, the solutions may be applied in other radio communication systems with reference to embodiments of the disclosure. The disclosure gives no limitation on this point.

Obviously, those skilled in the art should understand that the above modules or steps of the disclosure could be achieved through general calculating devices. They can be concentrated in a single calculating device or distributed in a network formed by multiple calculating devices. Optionally, they can be achieved by program codes that can be executed by calculating devices. Thus, they can be stored in storage devices to be executed by calculating devices, and under certain situation. The shown or described steps can be executed according to an order different from the above order, or they can be achieved by respectively making them into many integrated circuit modules or by making multiple modules or steps among them into a single integrated circuit module. In this way, the disclosure is not limited to combinations of any specific hardware and software.

Above contents are only preferred embodiments of the disclosure and are not used for limiting the disclosure. For those skilled in the art, the disclosure may have various alternations and changes. Any modifications, equivalent replacements and improvements within the spirit and principle of the disclosure should be within the protection scope of the disclosure.

What is claimed is:

1. A method for updating an air interface key, comprising:
a source Radio Network Controller (RNC) completing a static relocation towards a target RNC;
the target RNC performing an intra-Serving-RNC (SRNC) relocation; and
during the intra-SRNC relocation, the target RNC updating an enhanced key of the target RNC according to a key received from the source RNC or a core network node;
wherein before the source RNC completing the static relocation towards the target RNC:
the source RNC performs the static relocation towards the target RNC; and
during the static relocation, the source RNC directly sends a current key used by the source RNC to the target RNC, and the target RNC uses the current key to communicate with a User Equipment (UE); or
wherein the target RNC performing the intra-SRNC relocation comprises:
the target RNC performing a SRNC relocation towards a second target RNC, wherein the target RNC and the second target RNC are a same RNC; and
wherein updating the enhanced key of the target RNC according to the key received from the source RNC or the core network node comprises:
the target RNC using an intermediate key sent by the core network node to derive and update the enhanced key of the target RNC, wherein the intermediate key is generated by the core network node using a saved traditional key and a current intermediate key after a last Serving RNC (SRNC) static relocation is completed successfully, and is sent to the target RNC by the core network node.

2. The method according to claim 1, wherein before the step that the source RNC completes the static relocation towards the target RNC, the method further comprises:
the source RNC sending a relocation demand message to the core network node, wherein the relocation demand message comprises a current enhanced key of the source RNC, wherein the current enhanced key comprises a current enhanced integrity key $IK_U$, or a current enhanced ciphering key $CK_U$, or the current enhanced integrity key $IK_U$ and the current enhanced ciphering key $CK_U$; and
the core network node sending a relocation request message to the target RNC, wherein the relocation request message comprises the current enhanced key of the source RNC.

3. The method according to claim 2, wherein the step that the source RNC sends the relocation demand message to the core network node comprises:
the source RNC putting the current enhanced integrity key $IK_U$ in an IK field of the relocation demand massage, or putting the current enhanced ciphering key $CK_U$ in a CK field of the relocation demand message, or putting the current enhanced integrity key $IK_U$ in the IK field and putting the current enhanced ciphering key $CK_U$ in the CK field of the relocation demand message, and then sending the relocation demand message to the core network node; and the step that the core network node sends the relocation request message to the target RNC comprises:
the core network node putting the current enhanced integrity key $IK_U$ sent by the source RNC in the IK field of the relocation request massage, or putting the current enhanced ciphering key $CK_U$ in the CK field of the relocation request message, or putting the current enhanced integrity key $IK_U$ sent by the source RNC in the IK field and putting the current enhanced ciphering key $CK_U$ in the CK field of the relocation request message, and then sending the relocation request message to the target RNC.

4. The method according to claim 3, wherein after the step that the core network node sends the relocation request message to the target RNC, the method further comprises:
if the target RNC does not support an enhanced security mode, the content in the IK field of the relocation request message being taken as a traditional integrity key IK and the content in the CK field of the relocation request message being taken as a traditional ciphering key CK; and
if the target RNC supports the enhanced security mode, the content in the IK field of the relocation request message being taken as the $IK_U$ and the content in the CK field of the relocation request message being taken as the $CK_U$.

5. The method according to claim 1, wherein before the step that the source RNC completes the static relocation towards the target RNC, the method further comprises:
the source RNC sending an enhanced relocation request message to the target RNC, wherein the enhanced relocation request message comprises a current enhanced key of the source RNC, wherein the current enhanced key comprises a current enhanced integrity key $IK_U$, or a current enhanced ciphering key $CK_U$, or the current enhanced integrity key $IK_U$ and current enhanced ciphering key $CK_U$; and
the step that the source RNC sends the enhanced relocation request message to the target RNC comprises: the source RNC putting the current enhanced integrity key $IK_U$ in an IK field of the enhanced relocation request massage, or putting the current enhanced ciphering key $CK_U$ in a CK field of the enhanced relocation request message, or putting the current enhanced integrity key $IK_U$ in the IK field and putting the current enhanced ciphering key $CK_U$ in the CK field of the enhanced relocation request message, and then sending the enhanced relocation request massage to the target RNC; and
after the step that the source RNC sends the enhanced relocation request message to the target RNC, the method further comprises: if the target RNC does not support an enhanced security mode, the content in the IK field of the enhanced relocation request message being taken as a traditional integrity key IK and the content in the CK field of the enhanced relocation request message being taken as a traditional ciphering key CK; and if the target RNC supports the enhanced security mode, the content in the IK field of the enhanced relocation request message being taken as the $IK_U$ and the content in the CK field of the enhanced relocation request message being taken as the $CK_U$.

6. The method according to claim 2, wherein after the step that the core network node sends the relocation request message to the target RNC, the method further comprises:
the target RNC sending a relocation acknowledge message to the UE, wherein the relocation acknowledge message comprises security capability indication information of the target RNC; and the UE sending an acknowledge response message to the target RNC, wherein the acknowledge response message comprises security capability indication information of the UE.

7. The method according to claim 1, wherein the step that the target RNC performs the intra-SRNC relocation comprises:
the target RNC sending a relocation acknowledge message to the UE, wherein the relocation acknowledge message comprises a network Next hop Chaining Counter (NCC) of the core network node; and
the UE judging whether a terminal NCC corresponding to the currently activated key is equal to the network NCC;
if yes, the UE updating an enhanced key of the UE according to an intermediate key which is saved in advance and is corresponding to the terminal NCC; and
if not, the UE calculating the intermediate key and progressively increasing the corresponding terminal NCC till the terminal NCC is equal to the network NCC, and calculating and updating the enhanced key of the UE according to the intermediate key; and
the method further comprises:
the target RNC completing the intra-SRNC relocation; and
the core network node calculating a next hop intermediate key according to a saved traditional key and a current intermediate key, and sending the next hop intermediate key to the target RNC; and
before or after the step that the core network node calculates the next hop intermediate key according to the saved traditional key and the current deformation intermediate key, and the method further comprises:
the core network node progressively increasing the network NCC.

8. The method according to claim 1, wherein the step that the target RNC updates the enhanced key of the target RNC according to the key received from the source RNC or the core network node comprises:
the target RNC using a saved current enhanced key to update the enhanced key of the target RNC, wherein the current enhanced key is the current enhanced key of the source RNC.

9. The method according to claim 8, wherein the step that the target RNC uses the saved current enhanced key to update the enhanced key of the target RNC comprises:
the target RNC using the saved enhanced key which is received from the source RNC to update the enhanced key of the target RNC according to formulas of:

$$IK_U = F(IK_{U\_old}, \text{Parameter});$$

$$CK_U = F(CK_{U\_old}, \text{Parameter});$$

or, $$(IK_U, CK_u) = F(IK_{U\_old} \| CK_{U\_old}, \text{Parameter});$$

wherein F is any key generation function, Parameter is a parameter, $IK_U\_old$ and $CK_U\_old$ are the current enhanced keys of the target RNC, $IK_U$ and $CK_U$ are updated enhanced keys of the target RNC, and symbol $\|$ is concatenation.

10. The method according to claim 9, wherein the method further comprises:
the target RNC sending a relocation acknowledge message to the UE;
the UE receiving the relocation acknowledge message, and using the saved current enhanced key to update an enhanced key of the UE according to formulas of:

$$IK_U = F(IK_{U\_old}, \text{Parameter});$$

$$CK_U = F(CK_{U\_old}, \text{Parameter});$$

or, $$(IK_U, CK_U) = F(IK_{U\_old} \| CK_{U\_old}, \text{Parameter});$$

wherein F is any key generation function, Parameter is a parameter, $IK_U\_old$ and $CK_U\_old$ are current enhanced keys of the UE, $IK_U$ and $CK_U$ are updated enhanced keys of the UE, and symbol $\|$ is concatenation; and
the UE sending an acknowledge response message to the target RNC.

11. The method according to claim 1, wherein the step that the target RNC updates the enhanced key of the target RNC according to the key received from the source RNC or the core network node comprises:
the target RNC using an enhanced key sent by the source RNC or the core network node to update the enhanced key of the target RNC, wherein the enhanced key from the source RNC or the core network node is generated by the core network node using a saved traditional key and a current enhanced key after a last SRNC static relocation is completed successfully, and is sent to the target RNC by the core network node; and
the method further comprises: the target RNC sending a relocation acknowledge message to the UE, wherein the relocation acknowledge message comprises a network NCC of the core network node; and a UE judging whether a terminal NCC corresponding to a currently activated key is equal to the network NCC; if yes, the UE using an enhanced key which is saved in advance and is corresponding to the terminal NCC; and if not, the UE calculating an enhanced key and progressively increasing the corresponding terminal NCC till the terminal NCC is equal to the network NCC; and
the method further comprises: the target RNC completing the intra-SRNC relocation; and the core network node calculating a next hop enhanced key according to the saved traditional key and the current enhanced key, and sending the next hop enhanced key to the target RNC; and
before or after the step that the core network node calculates the next hop enhanced key according to the saved traditional key and the current enhanced key, the method further comprises: the core network node progressively increasing the network NCC.

12. The method according to claim 1, wherein the step that the target RNC updates the enhanced key of the target RNC according to the key received from the core network node comprises:
the core network node using a traditional key saved in the core network node and a current enhanced key to calculate a next hop enhanced key, and sending the next hop enhanced key to the target RNC; and
the target RNC using the next hop enhanced key to update the enhanced key of the target RNC; or
the source RNC is a source RNC supporting an enhanced security, and the target RNC is a target RNC supporting the enhanced security.

13. The method according to claim 2, wherein the relocation demand message further comprises a next hop intermediate key of the source RNC, and the relocation request message further comprises the next hop intermediate key of the source RNC.

14. The method according to claim 1, wherein before the step that the source RNC completes the static relocation towards the target RNC, the method further comprises:
the source RNC sending a relocation demand message to the core network node, wherein the relocation demand message comprises a current enhanced key of the source RNC and a next hop enhanced key of the source RNC, and the current enhanced key comprises a current enhanced integrity key $IK_U$, or a current enhanced ciphering key $CK_U$, or the current enhanced integrity key $IK_U$ and the current enhanced ciphering key $CK_U$; and
the core network node sending a relocation request message to the target RNC, wherein the relocation request message comprises the current enhanced key of the source RNC and the next hop enhanced key of the source RNC; and
the step that the target RNC updates the enhanced key of the target RNC according to the key received from the core network node comprises: the target RNC updating the enhanced key of the target RNC according to the next hop enhanced key of the source RNC, which is received from the core network node.

15. A radio access system, comprising:
a source Radio Network Controller (RNC), configured to complete a static relocation towards a target RNC; and
the target RNC, configured to, after the source RNC completes the static relocation towards the target RNC, perform an intra-Serving-RNC (SRNC) relocation, and during the intra-SRNC relocation, update an enhanced key of the target RNC according to a key received from the source RNC or a core network node; and
the core network node, configured to use a saved traditional key and a current intermediate key to generate a next hop intermediate key, and send the current intermediate key to the target RNC; or the core network node, configured to use a saved traditional key and the current intermediate key to generate a next hop enhanced key, and send the next hop enhanced key to the target RNC;
wherein the core network node further comprises a network Next hop Chaining Counter (NCC), configured to count number of times of generating the next hop intermediate key or the next hop enhanced key.

16. The radio access system according to claim 15, wherein the radio access system further comprises:
a User Equipment (UE), configured with a terminal NCC, wherein the UE comprises:
a receiving module, configured to receive a relocation acknowledge message sent by the target RNC, wherein the relocation acknowledge message comprises a network NCC of the core network node;
a judging module, configured to judge whether the terminal NCC is equal to the network NCC;
a positive result module, configured to, if the result of the judgment of the judging module is yes, update an enhanced key of the UE according to an intermediate key which is saved in advance and is corresponding to the terminal NCC; or, use an enhanced key which is saved in advance and is corresponding to the terminal NCC; and
a negative result module, configured to, if the result of the judgment of the judging module is no, calculate the intermediate key and progressively increase the corresponding terminal NCC till the terminal NCC is equal to the network NCC, and calculate and update the enhanced key of UE according to the intermediate key; or, calculate the enhanced key and progressively increase the corresponding terminal NCC till the terminal NCC is equal to the network NCC; or
the source RNC is a source RNC supporting an enhanced security, and the target RNC is a target RNC supporting the enhanced security.

* * * * *